United States Patent

Shiomi

[11] Patent Number: 6,021,104
[45] Date of Patent: Feb. 1, 2000

[54] DISC RECORDING AND/OR REPRODUCING APPARATUS

[75] Inventor: Tetsuhiro Shiomi, Kanagawa, Japan

[73] Assignee: Sony Corporation, Tokyo, Japan

[21] Appl. No.: 08/826,373

[22] Filed: Apr. 9, 1997

[30] Foreign Application Priority Data

Apr. 12, 1996 [JP] Japan .................................. 8-115647
May 2, 1996 [JP] Japan .................................. 8-111683

[51] Int. Cl.$^7$ .................................................. G11B 17/04
[52] U.S. Cl. .......................................................... 369/77.1
[58] Field of Search ................................ 369/75.1, 75.2,
369/77.1, 77.2; 360/99.02, 99.03, 99.06, 99.07

[56] References Cited

U.S. PATENT DOCUMENTS

| | | | |
|---|---|---|---|
| 4,701,901 | 10/1987 | Imai | 369/75.2 |
| 4,710,831 | 12/1987 | Nishimura | 369/77.2 |
| 4,723,185 | 2/1988 | Maeda | 369/77.2 |
| 4,773,057 | 9/1988 | Otsuka et al. | 369/75.2 |
| 4,815,065 | 3/1989 | Rouws | 369/77.2 |
| 4,882,722 | 11/1989 | Matsuura et al. | 369/75.2 |
| 5,034,833 | 7/1991 | Marlowe | 360/96.5 |
| 5,172,361 | 12/1992 | Urushibata et al. | 369/77.1 |
| 5,172,362 | 12/1992 | Hattori et al. | 369/77.2 |
| 5,204,850 | 4/1993 | Obata | 369/75.2 |
| 5,218,592 | 6/1993 | Isshiki et al. | 369/75.2 |
| 5,220,552 | 6/1993 | Yokoi et al. | 369/77.2 |
| 5,237,555 | 8/1993 | Tsuruta et al. | 369/77.2 |
| 5,251,195 | 10/1993 | Kawakami et al. | 369/75.2 |
| 5,351,228 | 9/1994 | Kanno et al. | 369/77.2 |
| 5,365,506 | 11/1994 | Lee | 369/75.2 |
| 5,493,560 | 2/1996 | Kim | 369/215 |
| 5,500,844 | 3/1996 | Kim et al. | 369/77.2 |
| 5,517,478 | 5/1996 | Park | 369/77.2 |
| 5,590,113 | 12/1996 | Choi | 369/270 |
| 5,633,850 | 5/1997 | Park | 369/77.1 |
| 5,675,566 | 10/1997 | Kosaka et al. | 369/77.1 |
| 5,684,777 | 11/1997 | Fukuyama et al. | 369/77.2 |
| 5,748,595 | 5/1998 | Nakajima | 369/77.2 |
| 5,793,730 | 8/1998 | Ootsuka | 369/77.1 |
| 5,812,510 | 9/1998 | Son | 369/75.2 |
| 5,880,907 | 3/1999 | Uwabo et al. | 360/99.06 |

FOREIGN PATENT DOCUMENTS

| | | |
|---|---|---|
| 1-57478 | 3/1989 | Japan . |
| 5-234346 | 9/1993 | Japan . |
| 7-244910 | 9/1995 | Japan . |
| 8-129815 | 5/1996 | Japan . |

*Primary Examiner*—David L. Ometz
*Attorney, Agent, or Firm*—Limbach & Limbach LLP; Seong-Kun Oh

[57] ABSTRACT

A recording/reproducing apparatus for a disc employing an optical disc for recording information signals as a recording medium. The apparatus includes a disc tray mounted for movement between a position protruded from a casing via an aperture formed in the casing and a position housed within the casing. The disc tray has a recess in which to set the disc. The apparatus includes a movement mechanism for moving the disc tray between the protruded position and the housed position. The movement mechanism has a control gear for moving the disc tray across the inner and the outer sides of the casing. The apparatus also includes an optical pickup for illuminating a light beam on a disc transported by the disc tray and an adjustment mechanism for adjusting the tilt relative to the disc of the optical axis of the light beam illuminated by the optical pickup on the disc. The adjustment mechanism is driven by the control gear. The adjustment mechanism includes a guide mechanism for guiding the optical pickup in a radial direction of the disc. The control gear has a further cam groove for adjusting the tilt relative to the disc of the optical axis of the light beam illuminated by the optical pickup on the disc. The further cam groove is engaged by the guide mechanism for adjusting the tilt relative to the disc of the optical axis of the light beam illuminated on the disc.

18 Claims, 18 Drawing Sheets

DISC RECORDING AND/OR REPRODUCING APPARATUS

BACKGROUND OF THE INVENTION

1. Field of the Invention

This invention relates to a disc recording and/or reproducing apparatus for recording information signals, such as speech or video signals, on a disc, such as an optical disc, or reproducing the information signals recorded on the disc. More particularly, it relates to a disc recording and/or reproducing apparatus for loading the disc using a disc tray moved across the inner side and the outer side of a casing.

2. Description of the Related Art

There has hitherto been used a disc player employing, as a recording medium, an optical disc having information signals, such as speech signals or video signals, recorded thereon. Among the disc players of this type, there is such disc player in which an optical disc with a diameter of 120 mm or 80 mm, having mainly music signals recorded thereon, referred to hereinafter as CD, and an optical disc with a diameter of 300 mm or 200 mm, having mainly video signals recorded thereon, referred to hereinafter as LD, can be selectively loaded for reproducing the information recorded on these discs.

This disc player includes a disc tray having the optical disc set thereon and moved across the inner side and the outer side of a casing, a disc driving unit having an optical pickup for reproducing the information signals recorded on the disc, a loading mechanism for moving the disc tray across the inner and outer sides of the casing making up a main body portion of the disc player for loading the optical disc, and an adjustment mechanism for rotating a disc reproducing unit relative to the optical disc for adjusting the tilt of the optical axis of the light beam radiated by the optical pickup on the disc relative to the disc.

The disc driving unit includes the optical pickup for converging the light beam radiated from the light source for radiating it on the optical disc, and a movement mechanism for moving the optical pickup radially of the optical disc. The loading mechanism includes a slider for moving the disc tray, a cam gear having a cam groove engaged by the slider, and a loading driving motor for rotating the cam gear. The adjustment for adjusting the tilt of the optical axis of the light beam relative to the disc includes a guide rail supporting the optical pickup, a supporting substrate rotatably supporting the guide rail, a rotary member for rotating the guide rail and a driving motor driving the rotary member. With the present disc player, the adjustment mechanism is driven by the driving motor and the optical pickup is tilted relative to the optical disc via the guide rail for adjusting the direction of the optical axis of the objective lens relative to the optical disc. The information signals recorded on the optical disc are read out by the optical pickup of the disc driving unit.

Meanwhile, with the above-described disc player, if a disc set on the disc tray is loaded on the disc loading unit, the disc needs to be moved horizontally relative to the casing and subsequently in a direction approaching the disc driving unit. This complicates the loading mechanism for the disc tray.

In addition, the above-described disc player is provided with a driving motor for moving the disc tray across the inner and outer sides of the casing for loading the optical disc and another separate driving motor for driving the adjustment mechanism configured for adjusting the tilt relative to the disc of the optical axis of the light beam radiated from the optical pickup. Since plural driving motors are used, the mechanism becomes complicated, while the manufacturing cost is increased.

Meanwhile, in the above-described disc player, a driving force connecting/disconnecting mechanism is provided between the adjustment mechanism and the driving motor, thus additionally complicating the structure.

In addition, if, with the disc player, the loading mechanism should be repaired, the operation of adjusting the loading mechanism needs to be performed with the optical disc loaded on the disc driving unit. In this case, a loading mechanism having a cam gear for moving a pair of sliders is arranged on the bottom surface extending parallel to the disc tray setting surface. Therefore, if the disc tray is entrained into the casing, the loading mechanism is covered up with the disc tray.

Thus, for repairing the loading mechanism, it becomes difficult to perform dismounting, adjustment and assembling of the loading mechanism with the disc tray entrained into the casing thus worsening workability in repair works or maintenance of the loading mechanism.

In addition, since the above-described disc player has a mechanism of intermittently driving the slider by an intermittent gear, it becomes necessary to provide a slider holding mechanism for holding the slider in position when not driving the slider. The result is that the loading mechanism in its entirety becomes complex in structure to render it difficult to secure stable operation of the loading mechanism.

Moreover, the casing of the disc player has an opening through which to pull out the disc tray, and a lid is provided for opening or closing the opening. If the player itself should be reduced in size in this case, the stroke of movement of the lid needs to be reduced.

OBJECTS AND SUMMARY OF THE INVENTION

It is therefore an object of the present invention to provide a novel disc recording and/or reproducing apparatus free from inconveniences attributable to the conventional disc recording and/or reproducing apparatus.

It is another object of the present invention to provide a disc recording and/or reproducing apparatus whereby the disc can be loaded reliably despite its simplified mechanism.

It is a further object of the present invention to provide a disc recording and/or reproducing apparatus in which a mechanism for moving the disc tray towards and away from the disc driving unit and a mechanism for adjusting the tilt of the optical axis of the light bean relative to the disc are actuated by a common driving motor for simplifying the mechanism for reducing the size of the apparatus.

It is a further object of the present invention to provide a disc recording and/or reproducing apparatus in which repair works or other like operations of the loading mechanism can be performed with the optical disc loaded on the disc driving unit.

It is yet another object of the present invention to provide a disc recording and/or reproducing apparatus in which the stroke of movement of the lid opening/closing the opening provided in the lid is reduced for further reducing the size of the apparatus.

In one aspect, the present invention provides a recording/reproducing apparatus for a disc including a disc tray mounted for movement between a position protruded from a casing via an aperture formed therein and a position housed within the casing, the disc tray having a recess in which to set the disc. The apparatus also includes a movement mechanism for moving the disc tray between the protruded position and the housed position. The movement mechanism has a lift mechanism for lifting or lowering the disc tray in a direction normal to the direction of movement between the protruded position and the housed position when the disc tray reaches the housed position. The lift mechanism has a control gear arranged on a lateral surface of the casing. The control gear has a cam groove along which the disc tray reaching the housed position is lifted or lowered.

Preferably, the movement mechanism includes a movement gear engaged with the control gear for moving the disc tray between the protruded position and the housed position and the lift mechanism includes a pair of sliders moved by the control gear for lifting and lowering the disc tray.

Preferably, the movement gear is disengaged from the control gear when the disc tray reaches the housed position, the gear causing the control gear to lower the slider and the disc tray.

Preferably, the lift mechanism includes a link mechanism for moving the pair of sliders in synchronism with each other, one of the sliders having an engagement portion engaging with a cam groove formed in the control gear, the slider being moved by the link mechanism in synchronism with the other slider.

Preferably, the apparatus further includes a rotational driving mechanism for rotationally driving a disc transported by the disc tray, and a clamper mechanism for clamping the transported disc along with the rotational driving mechanism. The clamper mechanism is operatively linked with the lifting and lowering movement of the disc tray by the lift mechanism so as to be lifted and lowered in association with the lifting and lowering movement of the disc tray.

Preferably, the slider has a groove for lifting and lowering the clamper mechanism and the clamper mechanism has an engagement portion engaged with the groove.

Preferably, the apparatus further includes an optical pickup for illuminating a light beam on a disc transported by the disc tray and an adjustment mechanism for adjusting the tilt relative to the disc of the optical axis of the light beam radiated by the optical pickup to the disc, the adjustment mechanism being driven by the control gear.

Preferably, the apparatus further includes a detection unit for detecting the tilt relative to the disc of the optical axis of the light beam radiated by the optical pickup to the disc, the control gear being driven based on a detection output from the detection unit.

Preferably, the adjustment mechanism includes a guide mechanism for guiding the optical pickup at least in the radial direction of the disc, the control gear having a further cam groove for adjusting the tilt relative to the disc of the optical axis of the light beam radiated by the optical pickup to the disc. The guide mechanism is engaged with the further cam groove for adjusting the tilt relative to the disc of the optical axis of the light beam radiated to the disc.

Preferably, the guide mechanism is rotatably supported relative to the casing.

Preferably, the apparatus further includes a lid for opening/closing the aperture and an opening/closure mechanism for moving the lid by the control gear between a position of opening the aperture and a position of closing the aperture, the opening/closure mechanism moving the lid between a position of closing the aperture, a first position protruded from the position of closing the aperture to a position ahead of the casing and a second position lowered from the first position. The aperture is opened when the lid reaches the second position.

Preferably, the opening/closure mechanism has a pair of frames having at least one inverted-L-shaped groove and a pair of opening/closing members having at least an inclined groove, the lid having an engagement portion engaged with the inverted-L-shaped groove and the inclined groove. The opening/closing members are moved vertically relative to the frames so that the engagement portion is moved by the inverted-L-shaped groove and the inclined groove. The lid is moved between the closure position, the first position and the second position.

Preferably, the opening/closure mechanism further includes an arm member for vertically moving the opening/closing members mounted for vertical movement relative to the frames and having at least an inclined groove, the lid having an engagement portion engaged with the inverted-L-shaped groove and the inclined groove. The opening/closing members is moved vertically relative to the frames so that the engagement portion is moved by the inverted-L-shaped groove and the inclined groove. The lid is moved between the closure position, the first position and the second position.

Preferably, the opening/closure mechanism further includes a lock unit for limiting the movement of the lid to the first position when the lid is at the position of closing the aperture.

In another aspect, the present invention provides a recording/reproducing apparatus for a disc including a disc tray mounted for movement between a position protruded from a casing via an aperture formed therein and a position housed within the casing, the disc tray having a recess in which to set the disc. The apparatus includes a movement mechanism for moving the disc tray between the protruded position and the housed position, the movement mechanism having a control gear for moving the disc tray between the protruded position and the housed position. The apparatus also includes an optical pickup for illuminating a light beam on a disc transported by the disc tray, and an adjustment mechanism for adjusting the tilt relative to the disc of the optical axis of the light beam illuminated by the optical pickup on the disc. The adjustment mechanism is driven by the control gear.

Preferably, the apparatus includes a detection unit for detecting the tilt relative to the disc of the optical axis of the light beam illuminated by the optical pickup on the disc. The control gear is driven based on a detection output from the detection unit.

Preferably, the adjustment mechanism includes a guide mechanism for guiding the optical pickup at least in a radial direction of the disc. The control gear has a further cam groove for adjusting the tilt relative to the disc of the optical axis of the light beam illuminated by the optical pickup on the disc. The further cam groove is engaged by the guide mechanism for adjusting the tilt relative to the disc of the optical axis of the light beam illuminated on the disc.

Preferably, the guide mechanism is rotatably supported relative to the casing.

In still another aspect, the present invention provides a recording/reproducing apparatus for a disc including a casing having an aperture formed in the front side thereof, and a disc tray mounted for movement between a position protruded from a casing via an aperture formed therein and a position housed within the casing, the disc tray having a recess in which to set the disc. The apparatus also includes a lid for opening/closing the aperture and a movement mechanism for moving the lid between a position of closing the aperture and a position of opening the aperture. The opening/closure mechanism moves the lid between a position of closing the aperture, a first position protruded from the closure position to a position ahead of the casing and a second position lowered from the first position for opening the aperture.

Preferably, the movement mechanism includes a pair of frames having at least one inverted L-shaped groove, and a pair of movement members mounted vertically movably relative to the frames and at least having one inclined groove. The lid has an engagement portion engaged with the inverted L-shaped groove and the inclined groove. The opening/closing mechanism is moved vertically relative to the frame so that the engagement portion is moved by the inverted L-shaped groove and the inclined groove. The lid is moved between the closure position, the first position and the second position.

Preferably, the movement mechanism includes an arm member for vertically moving the movement member, a control gear provided on one of the frames and formed with a cam groove and a slider engaged in the cam groove for rotating the arm member.

Preferably, the opening/closure mechanism further includes a lock unit for limiting movement of the lid to the first position when the lid is at the position of closing the aperture.

Preferably, the movement mechanism has a pair of frames having at least one inverted L-shaped groove and a pair of opening/closing members mounted vertically movably relative to the frames and having at least an inclined groove. The lid has an engagement portion engaged with the inverted L-shaped groove and the inclined groove. The movement members are moved vertically relative to the frame so that the engagement portion is moved by the inverted L-shaped groove and the inclined groove. The lid is moved between the closure position, the first position and the second position.

Preferably, the lock unit has a further groove continuous to the inclined groove in the movement member. The further groove extends vertically when the lid is in the closure position.

DESCRIPTION OF THE PREFERRED EMBODIMENTS

Figure 1:
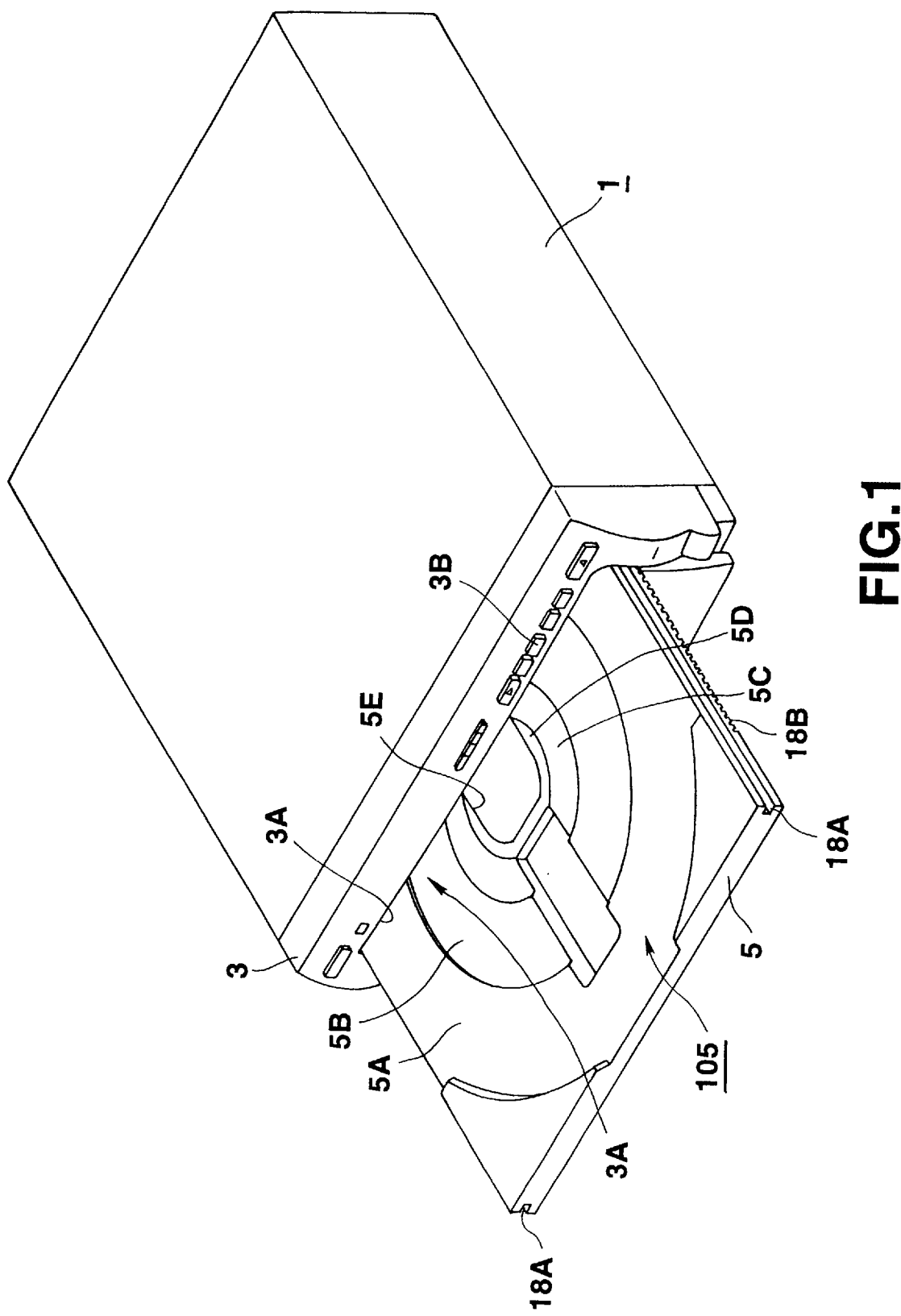
FIG. 1 is a perspective view showing a disc player embodying the present invention.

Referring to the drawings, a disc player, which is a disc recording and/or reproducing apparatus embodying the present invention, is explained in detail.

The disc player embodying the present invention, herein shown, is configured so that a CD 120 mm or 80 mm in diameter having mainly music signals recorded thereon and an LD 300 mm or 200 mm in diameter having mainly video signals recorded thereon can be selectively loaded for selectively reproducing the information recorded on these discs. That is, the present disc player is a compatible device capable of selectively loading the CD or LD as recording media.

The disc player according to the present invention includes, on the front side of an outer casing 1, a front panel 3 having an aperture 3A for disc loading, as shown in FIG. 1. On the front panel 3 are mounted a set of operating buttons 3B used for selecting various operating modes for the disc player. The disc player includes a disc tray 5 movable between a position protruded from the casing 1 and a position receded into the inside of the casing 1, as shown in FIG. 1. The disc tray 5 is moved across the inside and the outside of the casing 1 via the aperture 3A formed in the front panel 3. In the upper surface of the disc tray 5 are concentrically formed plural recesses 105 in which to set optical discs 2 to be reproduced by the present disc player. These recesses include a first recess 5A, arranged in the outermost radial portion for setting the LD 300 mm in diameter, a second recess 5B on the radially inner side of the recess 5A for setting the LD 200 mm in diameter, a third recess 5C on the radially inner side of the recess 5B for setting the CD 120 mm in diameter and a fourth recess 5D, arranged in the innermost radial portion for setting the CD 80 mm in diameter, as shown in FIG. 2.

Figure 3:
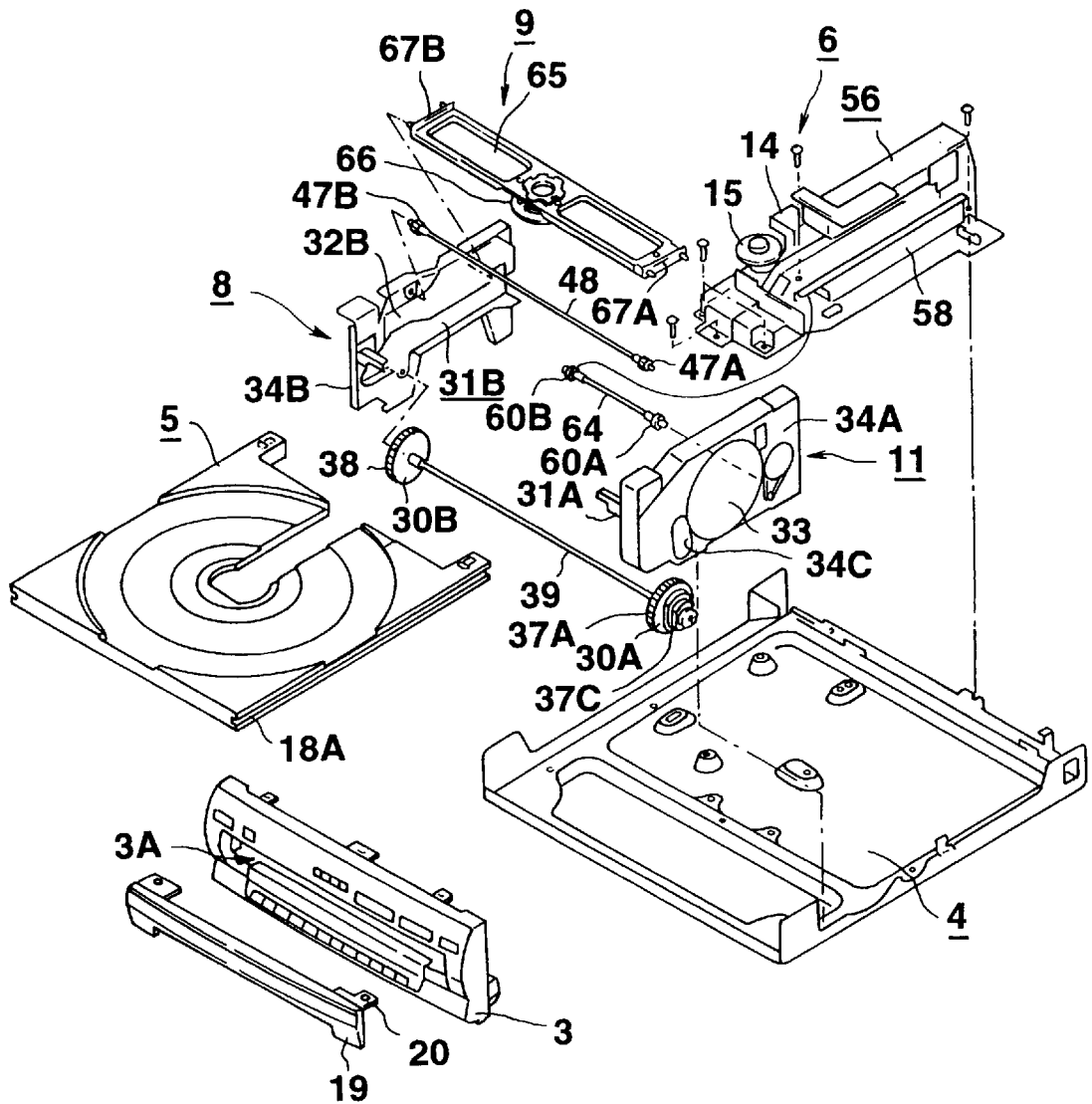
FIG. 3 is an exploded perspective view showing the entire structure of the disc player.
Figure 4:
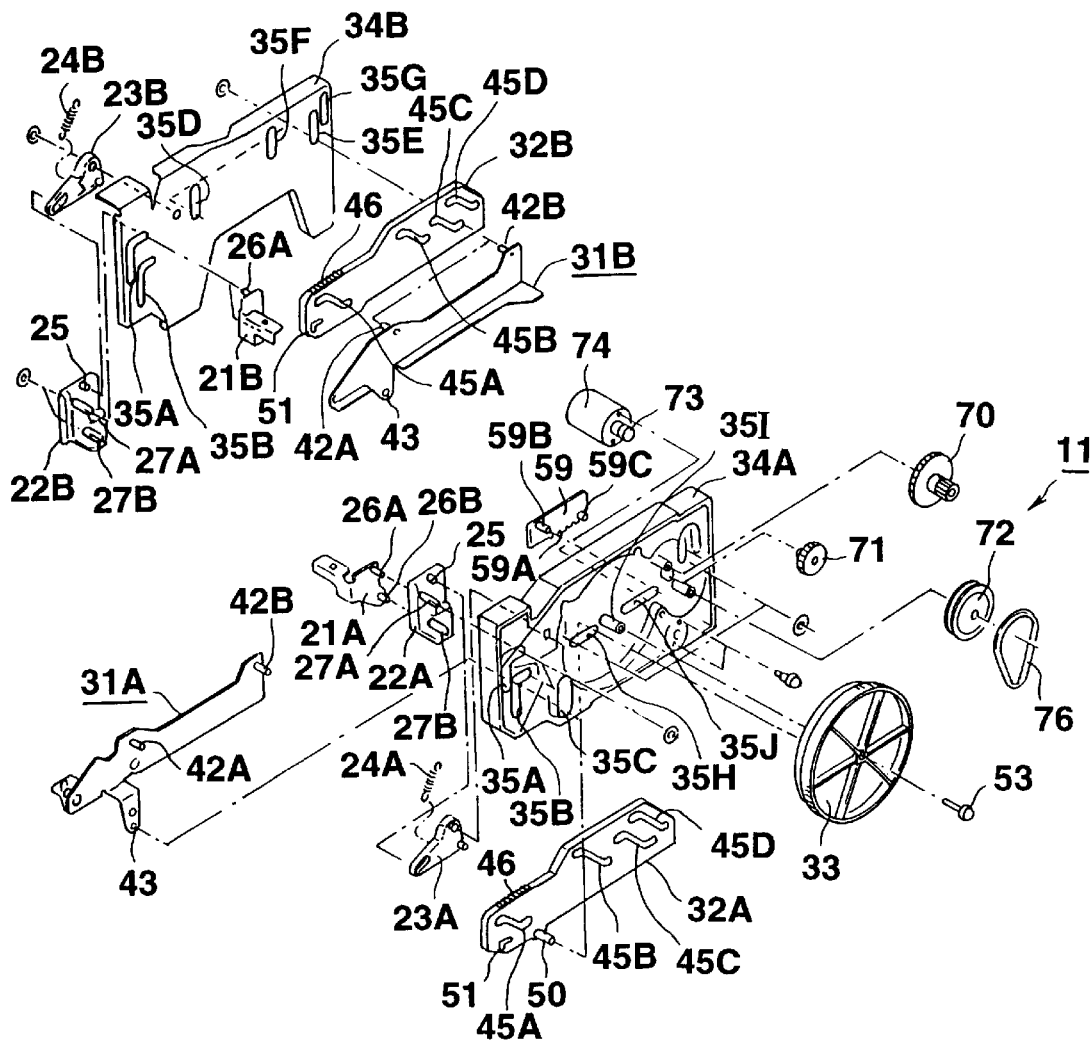
FIG. 4 is an exploded perspective view showing essential portions of the disc player.
Figure 5:
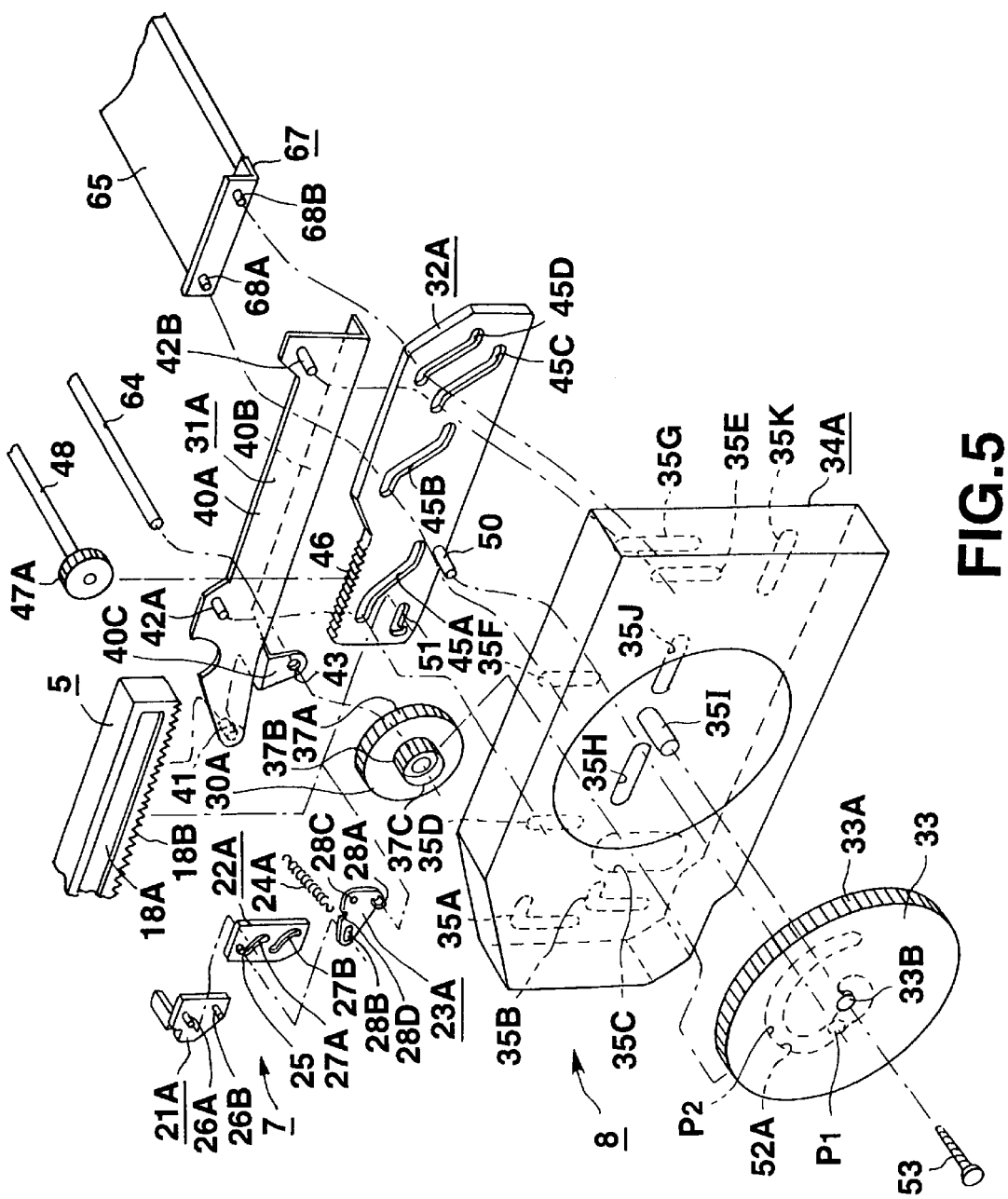
FIG. 5 is an exploded perspective view showing a disc tray movement mechanism provided on the disc player.

The disc player 1 includes a disc driving unit 6 having an optical pickup 14 for reading out the information signals recorded on the optical disc 2, as shown in FIGS. 2 to 6. The disc player also includes an opening/closing mechanism 7 for opening/closing the aperture 3A formed in the front panel 3 and a movement mechanism 8 for moving the disc tray 5 with the optical disc 2 set thereon across the inner side and the outer side of the casing 1, as shown in FIG. 5. The disc player also includes a chuck mechanism 9 for holding the optical disc 2 set on the disc tray 5 moved by the movement mechanism 8 for rotation in unison with the disc table 15 in cooperation with the disc table of the disc driving unit 6, as shown in FIG. 5.

Figure 6:
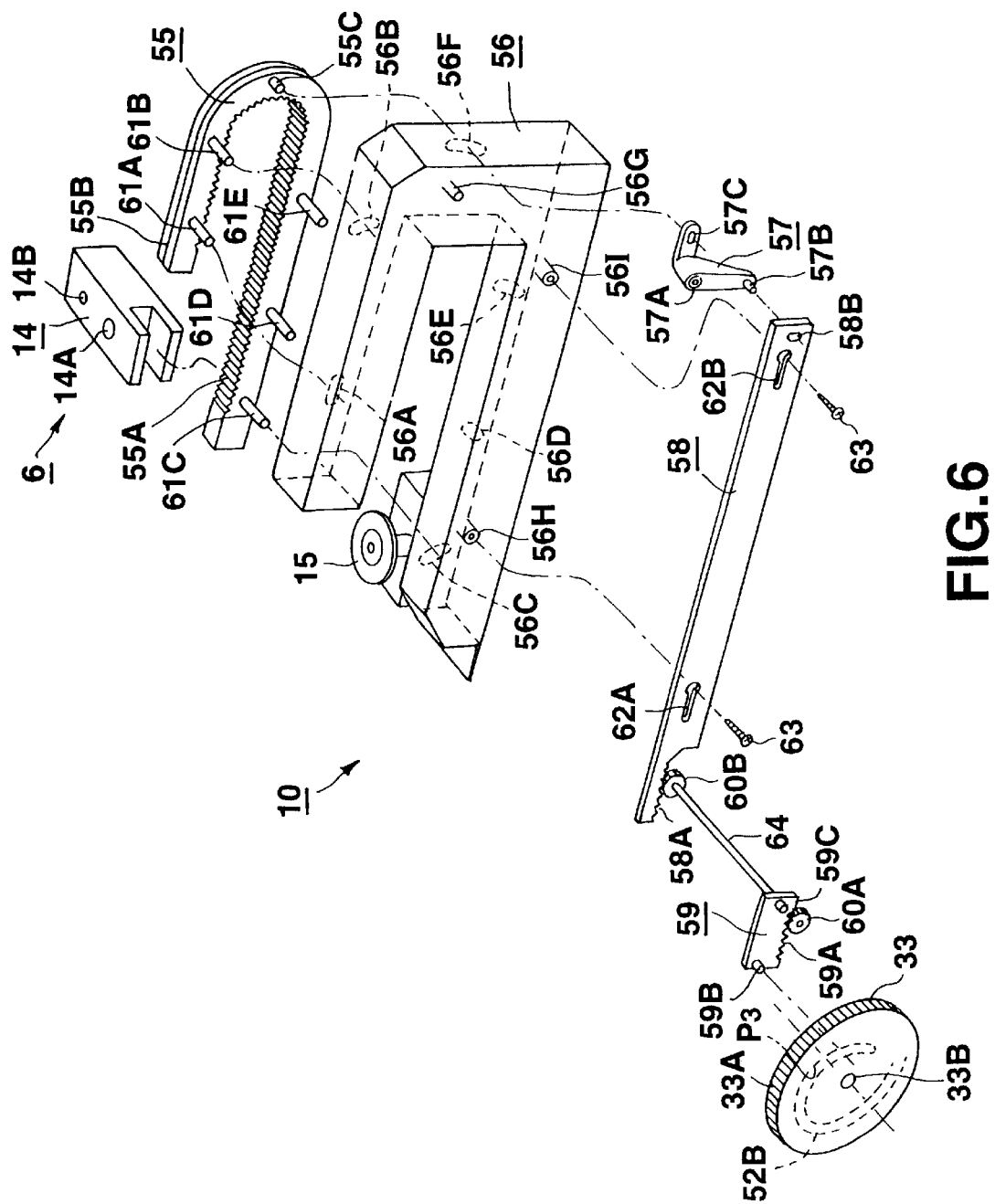
FIG. 6 is an exploded perspective view showing an adjustment mechanism for an optical pickup provided on the disc player.
Figure 7:
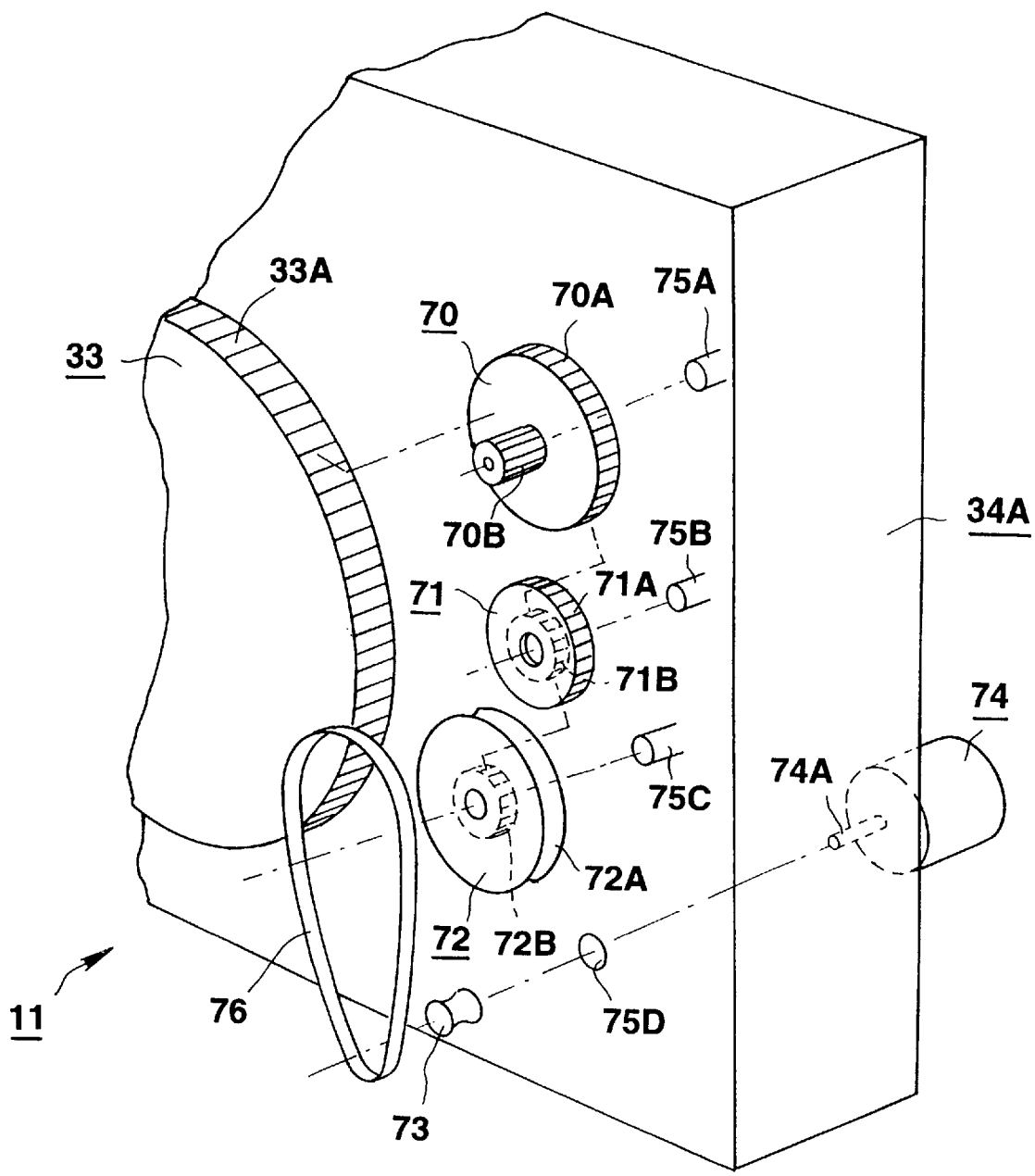
FIG. 7 is an exploded perspective view showing a driving mechanism provided on the disc player.

The disc player 1 also includes an adjustment mechanism for adjusting the tilt of the optical axis of an objective lens 14A provided on the optical pickup 14 relative to the optical disc 2 set on the disc table 15 for rotation in unison with the disc table, as shown in FIG. 6. The disc player 1 also includes a driving mechanism 11 for driving the movement mechanism 8 and the adjustment mechanism 10, as shown in FIGS. 4 and 7. These mechanisms are assembled on the chassis 4 arranged within the casing 1.

Figure 2:
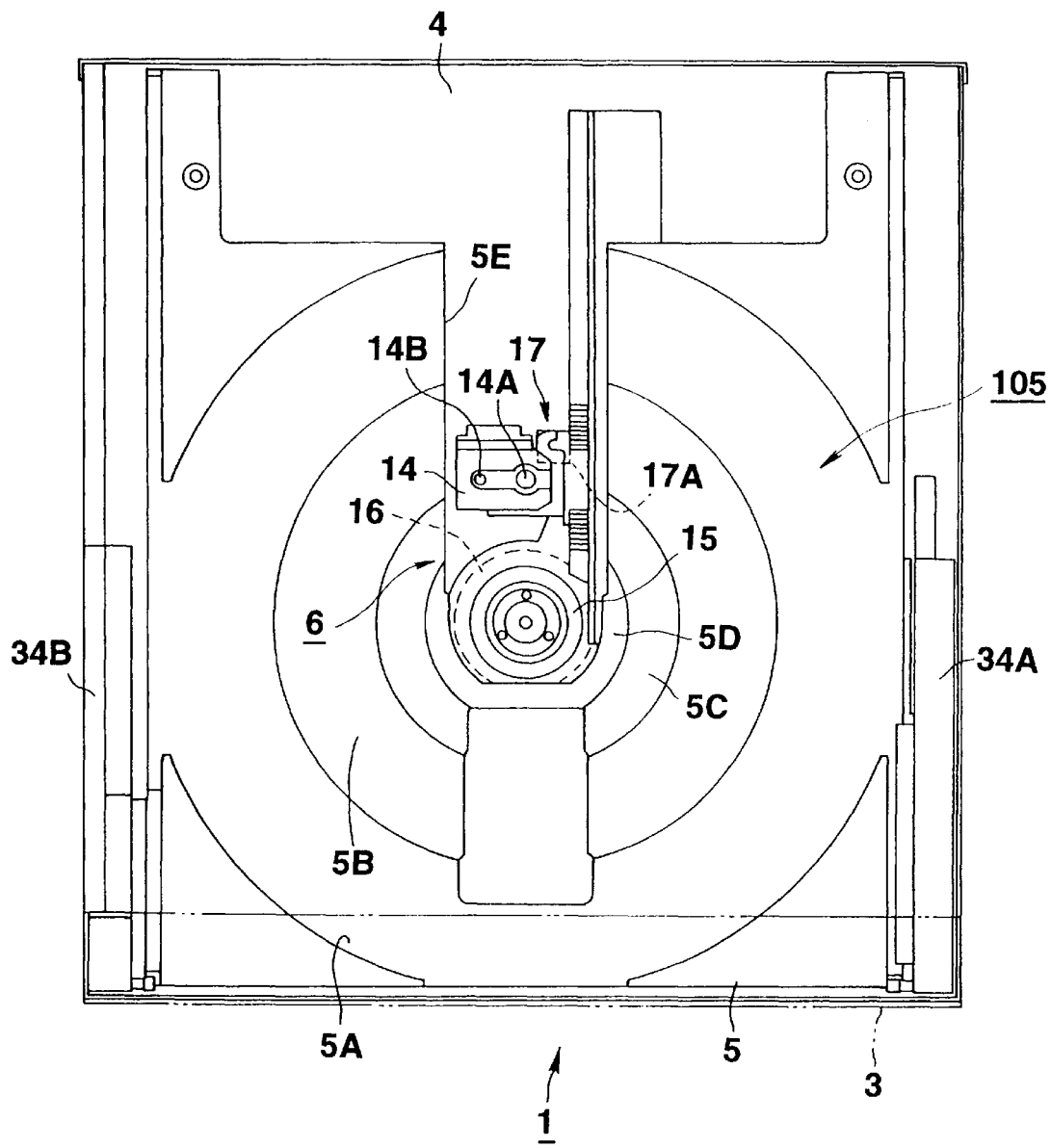
FIG. 2 is a plan view of the disc player.

The disc driving unit 6, provided on the disc player according to the present invention, includes the disc table 15 for holding the optical disc 2 in cooperation with the chuck mechanism 9 and a spindle motor 16 for rotating the disc table 15 in unison with the optical disc 2, as shown in FIGS. 2 and 6. The disc driving unit 6 also includes the optical pickup 14 and a pickup feed mechanism 17 having a driving motor for moving the optical pickup 14 along the radius of the optical disc 2. The optical pickup illuminates a light beam on the optical disc 2 rotated in unison with the disc table 15 for detecting the return light reflected from the optical disc 2 for reading out the information signals recorded on the disc.

The optical pickup 14 constituting the disc driving unit 6 includes a semiconductor laser as a light source for radiating a light beam illuminated on the optical disc 2, optical components, such as a half mirror, a beam splitter or a collimator lens, an objective lens 14A for converging the light beam on a recording track of the optical disc 2, and a biaxial actuator for driving and displacing the objective lens 14A in the focusing direction corresponding to the direction of the optical axis of the objective lens 14A. Within an optical block accommodating optical components of the optical pickup 14 is provided a photodetector for detecting the return light reflected from the optical disc 2 for detecting the information signals recorded on the optical disc 2 or focusing or tracking error signals of the light beam relative to the optical disc 2.

The optical pickup 14 has a skew sensor 14B for detecting the tilt relative to the optical disc 2 of the optical axis of the light beam radiated from a light source so as to be illuminated on the optical disc 2, as shown in FIG. 6. The skew sensor 14B includes a light emitting element for radiating the skew detection light to the optical disc 2 and a light receiving element for receiving the skew detection light reflected from the optical disc 2. The optical pickup 14 has the adjustment mechanism, as later explained, driven based on the detection signal detected by the skew sensor 14B for adjusting the tilt relative to the optical disc 2 of the optical axis of the light beam illuminated on the optical disc 2.

When reproducing the optical disc 2, the disc table 15 of the disc driving unit 6 and the optical pickup 14 face the recess 105 of the disc tray 5 via substantially rectangular playback aperture 5E extending from the rear end as far as the center of the disc tray 5 for facing the optical disc 2 set in the recess 105.

On both lateral sides of the disc tray 15, having the optical disc 2 set thereon for moving the optical disc 2 across the inner and outer sides of the casing 1, are formed guide grooves 18A, 18A each extending parallel to the direction of movement of the disc tray and having a length corresponding to the movement stroke of the disc tray 5. On the lower ends of both sides of the disc tray 15 formed with the guide grooves 18A, 18A are formed rack gears 18B extending parallel to the direction of movement of the disc tray 5. The disc tray 5 is moved by the movement mechanism 8 between the position protruded out of the casing 1 and the position receded into the inside of the casing 1.

The lid opening/closure mechanism 7, adapted for opening/closing a lid 19, adapted in turn for opening/closing the aperture 3A formed in the front panel 3, includes a mounting plate 20 supporting the lid 19, left and right movement plates 21A, 21B for moving the mounting plate 20, left and right sliders 22A, 22B for movably supporting the movement plates 21A, 21B, left and right supporting arms 23A, 23B for supporting these sliders 22A, 22B, and tension coil springs 24A, 24B for rotationally biasing the supporting arms 23A, 23B as shown in FIGS. 3, 4 and 5.

Figure 8:
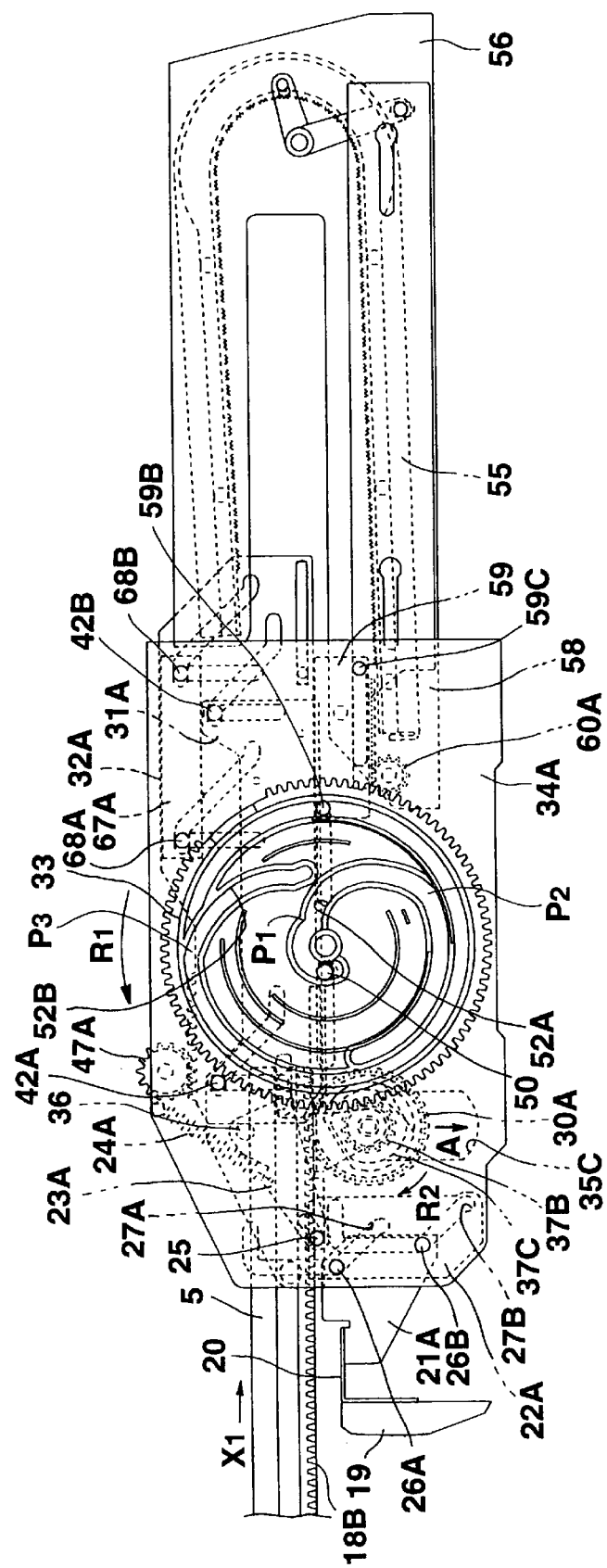
FIG. 8 is a side view showing the starting state of the operation of the lid opening/closing mechanism and the disc tray movement mechanism provided on the disc player.

The lid 19 moved by this lid opening/closure mechanism 7 in a direction of opening/closing the aperture 3A is formed as a substantially rectangular plate dimensioned to close the aperture 3A, as shown in FIG. 3. The mounting plate 20, supporting the lid 19, is of an L-shaped cross-section, as shown in FIGS. 3 and 8, and the lid 19 is secured to one end of the plate 20 by set screws. Both sides of the opposite end of the mounting plate 20 are supported by movement plates 21A, 21B, as shown in FIG. 8. On the major surfaces of the movement plates 21A, 21B are set first and second supporting protrusions 26A, 26B as one with the movement plates, as shown in FIG. 4. On the sliders 22A, 22B are mounted engagement protrusions 25 engaged by the supporting arms 23A, 23B for connection to the supporting arms 23, 23B. First and second guide grooves 27A, 27B are formed in the sliders 22A, 22B. In these guide grooves 27A, 27B are inserted the supporting protrusions 26A, 26B of the movement plates 21A, 21B for supporting the movement plates 21A, 21B for movement along the guide grooves 27A, 27B.

In the frames 34A, 34B of the movement mechanism 8, as later explained, are formed inverted L-shaped first and second guide grooves 35A, 35B. Into these guide grooves 35A, 35B in the frames 34A, 34B are inserted the supporting protrusions 26A, 26B of the movement plates 21A, 21B inserted in turn into the guide grooves 27A, 27B of the sliders 22A, 22B, so that the movement plates 21A, 21B are supported for movement along the guide grooves 35A, 35B. The supporting arms 23A, 23B are substantially triangular in profile, and, at each corner of the triangle, there are formed an actuating rib 28A having an arcuate cross-section, a guide groove 28B and a supporting hole 28C. The actuating rib 28A of each of the supporting arms 23A, 23B is inserted into an actuating slit 51 formed in a slide plate 32 of the movement mechanism 8 as later explained. A spring retainer 28D is formed at one side of each of the supporting arms 23A, 23B. On the frame 34A is set a supporting pin 36 inserted into the supporting hole 28C of each of the supporting arms 23A, 23B. Each of the tension coil springs 24A, 24B is mounted by having its one end supported by the frames 34A, 34B and by having its other end retained by a spring retainer 28D of each of the supporting arms 23A, 23B. These tension coil springs 24A, 24B rotationally bias the supporting arms 23A, 23B so that the aperture 3A is closed by the lid 19.

Referring to FIGS. 3 to 5, the movement mechanism 8 has left and right movement gears 30A, 30B for moving the disc tray 5 in the horizontal direction, left and right supporting plates 31A, 31B for movably supporting the disc tray 5, left and right slide plates 32A, 32B for vertically moving the disc tray 5, a control gear 33 for driving the slide plates 32A, 32B and left and right frames 34A, 34B for supporting the disc tray 5, slide plates 32A, 32B and the control gear 33.

The movement gear 30A is formed as one and coaxially with a first large-diameter gear 37A and a second small-diameter gear 37B. The movement gear 30B is formed only with a first gear 38. These movement gears 30A, 30B are interconnected by a connecting shaft 39. The movement gears 30A, 30B are rotatably supported by the supporting plates 31A, 31B and arranged in this state below the disc tray 5, with the first and second gears 37A, 38 meshing with the rack gear 18B of the disc tray 5. The movement gear 30A is formed with a substantially elliptically-shaped cam protrusion 37C which is disposed on the outer periphery of the second gear 37B. The movement gear 30A is positioned with the cam protrusion 37C in register with the cam groove 35C formed in the frame 34A and is rotatably supported by the frame 34A.

Each of the supporting plates 31A, 31B includes a substantially rectangular main portion 40A facing one of opposite lateral sides of the disc tray 5, a guide 40B for guiding the associated lateral side of the disc tray 5, and a support 40C rotatably supporting the connecting shaft 39 interconnecting the movement gears 30A, 30B. On the foremost part of the main portion 40A is set upright a first guide pin 41 for movably supporting the disc tray 5. This guide pin 41 is inserted into the guide groove 18A of the disc tray 5 for movably supporting the disc tray 5. On the main portion 40A are set upright first and second supporting pins 42A, 42B supporting the slide plate 32. The guide 40B is bent in the form of a letter U in cross-section for extending from the lower end of the main portion 40A towards the disc tray 5. The support 40C is bent towards the lower end of the main portion 40A and has an end supporting hole 43.

In the slide plates 32A, 32B, substantially rectangular in shape as shown in FIG. 5, are formed substantially S-shaped first to fourth guide grooves 45A to 45D. The supporting pins 42A, 42B of the supporting plates 31A, 31B are inserted into the first guide groove 45A and the third guide groove 45C of the slide plates 32A, 32B. These supporting pins 42A, 42B are inserted into first vertical guide grooves 35D, 35E formed in the frame 34A so as to be moved vertically under guidance by these vertical guide grooves 35D, 35E. Into the second guide groove 45B and fourth guide grove 45D of the slide plates 32A, 32B are inserted supporting protrusions 68A, 68B of the guide members 67A, 67B making up the chuck mechanism 9 as later explained. These supporting protrusions 68A, 68B are inserted into second vertical guide grooves 35F, 35G formed in the frame 34A so as to be moved vertically under guidance by these vertical guide grooves 35F, 35G. A rack gear 46 is formed at the upper end towards one side of each of the slide plates 32A, 32B and engaged by each of link gears 47A, 47B. The link gears 47A, 47B are engaged with rack gears 46 of the slide plates 32A, 32B for rotation in unison by a connecting shaft 48. Thus the slide plates 32A, 32B are moved in synchronism via link gears 47A, 47B. The slide plates 32A, 32B are formed on the lower lateral sides thereof with engagement lugs 50 engaged in guide grooves 35H formed in the frame 34A into engagement with the control gear 33.

The control gear 33 has a gear 33A on its outer periphery and a rotation supporting opening 33B at a mid portion. The control gear 33 has its rotation supporting opening 33B rotatably supported via supporting screw 53 by a supporting protrusion 35I provided on the frame 34A. That is, this control gear 33 has a rotary shaft parallel to the bottom surface of the recess 105 of the disc tray 5 in which the optical disc 2 is set. The control gear 33 has, on its major surface, a first cam groove 52A for moving the slide plate 32A therein and a second cam groove 52B for moving therein the slide plate 59 of the adjustment mechanism 10 as later explained, as shown in FIGS. 5 and 6. These first and second cam grooves 52A, 52B are formed spirally with pre-set curvatures. The first cam groove 52A has a modified curvature position between a domain formed on the outer periphery of the rotation supporting hole 33B and a domain concentrically formed about the rotation supporting hole 33B as center. Thus, the first cam groove 52A has a first inflection position P1 with a changing curvature, towards the rotation supporting hole 33B, and a second inflection position P2 with a changing curvature, towards the outer periphery of the control gear. The second cam groove 52b has a domain with changing curvature at one end of the concentric domain centered about the rotation supporting hole 33B. Thus the second cam groove 52B has an inflection position P3 with a changing curvature in the vicinity of the rotation supporting hole 33B, as shown in FIG. 6.

The adjustment mechanism 10 includes a guide rail 55 for movably supporting the optical pickup 14, a disc driving unit supporting substrate 56 for rotatably supporting the guide rail 55, a rotary lever 57 for rotating the guide rail 55, a rotation plate 58 for rotating the rotary lever 57, a movement plate 59 for moving the rotation plate 58, and a pair of connecting gears 60A, 60B interconnecting the rotation plate 58 and the movement plate 59, as shown in FIG. 6. The guide rail 55 is formed of a resin material in a substantially U-configuration. The guide rail 55 has on its inner periphery a rack gear 55A engaged with a gear constituting a pickup feed mechanism 17 of the optical pickup 14. The guide rail 55 has on its outer periphery a rail portion 55B for movably supporting the optical pickup 14. The guide rail 55 has on its lateral side first to fifth supporting lugs 61A to 61E at pre-set intervals from one another. The guide rail 55 is rotatably supported by the disc driving unit supporting substrate 56 via the first to fifth supporting lugs 61A to 61E. The guide rail 55 also is formed with a rotation lug 55C at its mid portion corresponding to the U-shaped bend.

The disc driving unit supporting substrate 56 is formed with first to fifth guide holes 56A to 56E for rotatably supporting the guide rail 55. Into these fifth guide holes 56A to 56E are inserted the first to fifth supporting lugs 61A to 61E of the guide rail 55 for supporting the guide rail 61. The disc driving unit supporting substrate 56 is also formed with an arcuately-shaped rotation guide groove 56F engaged by the rotation lug 55C of the guide rail 55. The disc driving unit supporting substrate 56 is also formed with a supporting protrusion 56G for rotatably supporting the rotary lever 57. On the disc driving unit supporting substrate 56 are set supporting protrusions 56H, 56I supporting the rotation plate 58. The rotation plate 57 is substantially chevron-shaped and has a mid rotation supporting hole 57A. A connection pin 57B connected to the rotation plate 58 is protuberantly formed on one end of the rotary lever 57, while a connection hole 57 into which is inserted the rotation protrusion 55C is formed in the opposite end of the rotary lever 57. The supporting protrusion 56G of the disc driving unit supporting substrate 56 is inserted into the rotation supporting hole 57A of the rotary lever 57 for rotatably supporting the rotary lever 57. The rotation plate 58 is substantially rectangular in shape and a rack gear 58A is formed on its lower side. In the opposite end of the rotation plate 58 is formed a connection hole 58B into which is introduced the connection pin 57B of the rotary lever 57. In the rotation plate 58 are formed parallel first and second guide grooves 62A, 62B for extending in the longitudinal direction. The rotation plate 58 is movably supported by the disc driving unit supporting substrate 56 via guide screws 63 inserted into these guide grooves 62A, 62B.

The movement plate 59 is substantially in the form of a rectangular plate carrying a rack gear 59A. The movement plate 59 is formed with a cam protrusion 59B and a supporting protrusion 59C at both corners thereof. The cam protrusion 59B of the movement plate 59 is inserted through a guide groove 35J formed in the frame 34A into engagement with a second cam groove 59B of the control gear 33. The supporting protrusion 59C of the movement plate 59 is inserted into a guide groove 35K formed in the frame 34A for slidably supporting the movement plate 59.

A connecting gear 60A meshes with the rack gear 58A of the rotation plate 58, while a connection gear 60B meshes with the rack gear 59A of the movement plate 60. These connection gears 60A and 60B are interconnected by a connection shaft 64 for being rotated in synchronism with each other.

The chuck mechanism 9 includes a chuck plate 65 having its both ends supported astride the slide plates 32A, 32B of the movement mechanism 8 and a chuck member 66 arranged at a mid portion of the chuck plate 65. The chuck plate 65 is substantially rectangular in shape and has at its ends guide members 67A, 67B formed respectively with supporting protrusions 68A, 68B. These supporting protrusions 68A, 68B are inserted into the second guide groove 45B and the third guide groove 45C of the slide plates 32A, 32B. The chuck member 66 is arranged facing the disc table 15 of the disc driving unit 6 and includes a compression coil spring, not shown, for absorbing the shock produced during retention of the optical disc 2, and a magnet, not shown, for absorbing the optical disc to the disc table 15 by holding the center portion of the optical disc 2.

In the above-described chuck mechanism 9, the chuck plate 65 is moved into and out of contact with the disc table 15 with movement of the slide plates 32A, 32B of the movement mechanism 8. The chuck mechanism 9 rotatably holds the optical disc 2 between the disc table 15 and the chuck member 66.

Referring to FIG. 7, the driving mechanism 11 for driving the adjustment mechanism 10 and the movement mechanism 8 includes a first gear 70 for rotationally driving the control gear 33, a second gear 72 for rotationally driving the first gear 70, a first pulley 72 for rotationally driving the second gear 71, a second pulley 73 for rotationally driving the first pulley 72 and a driving motor 74 for rotationally driving the second pulley 73. The first gear 70 includes a first gear portion 70A disposed towards the outer peripheral side and a second gear portion 70B positioned towards the inner peripheral side of the first gear portion 70A. The first gear 70 is rotatably supported by a supporting protrusion 75A provided on the frame 34A by the second gear portion 70B meshing with the gear portion 33A of the control gear 34A. The second gear 71 includes a first gear portion 71A disposed towards the outer peripheral side and a second gear portion 71B positioned towards the inner peripheral side of the first gear portion 71A. The second gear 71 is rotatably supported by a supporting protrusion 75B provided on the frame 34A by the second gear portion 71B meshing with the first gear portion 70A of the first gear 70.

The first pulley 72 includes a large-diameter pulley portion 72A formed as one and coaxially with a gear portion 72B smaller in diameter than the pulley portion 72A. The first pulley 72 is rotatably supported by a supporting protrusion 75C formed on the frame 34A by the gear portion 72B meshing with the first gear portion 71A of the second gear 71. The second pulley 73 has a pulley portion 72A on its outer peripheral side, and a pulley belt 76 is installed between the pulley portion 73A and the pulley portion 72A of the first pulley 72. A driving motor 74 is mounted on the frame 34A by having its driving shaft 74A passed through a mounting hole 75D formed in the frame 34A. The second pulley 73 is arranged on the foremost part of the driving shaft 74A.

With the above-described driving mechanism 11, the operation of rotationally driving the control gear 33 by the driving motor 74 is hereinafter explained. By the driving shaft 74A of the driving motor 74 run in rotation, the second pulley 73 is run in rotation for rotationally driving the first pulley 72 via pulley belt 76. By the first pulley 72 run in rotation, the second gear portion 71B of the second gear 71 is run in rotation via gear portion 72B. By the second gear portion 71B of the second gear 71 run in rotation, the first gear portion 70A of the first gear 70 is run in rotation via first gear portion 71A. By the first gear portion 70A of the first gear 70 run in rotation, the first gear portion 33A of the control gear 33 is run in rotation via second gear portion 70B.

With the above-described disc player 1, the opening/closure operation of opening/closing the aperture 3A by movement of the lid 19 by the opening/closure mechanism 7, the loading operation of the movement mechanism 8 entraining the disc tray 5 with the optical disc 2 set thereon into the inside of the casing 1, and the adjustment operation of the adjustment mechanism 10 adjusting the tilt of the light beam by rotating the guide rail 55, will be explained with reference to the drawings.

Figure 9:
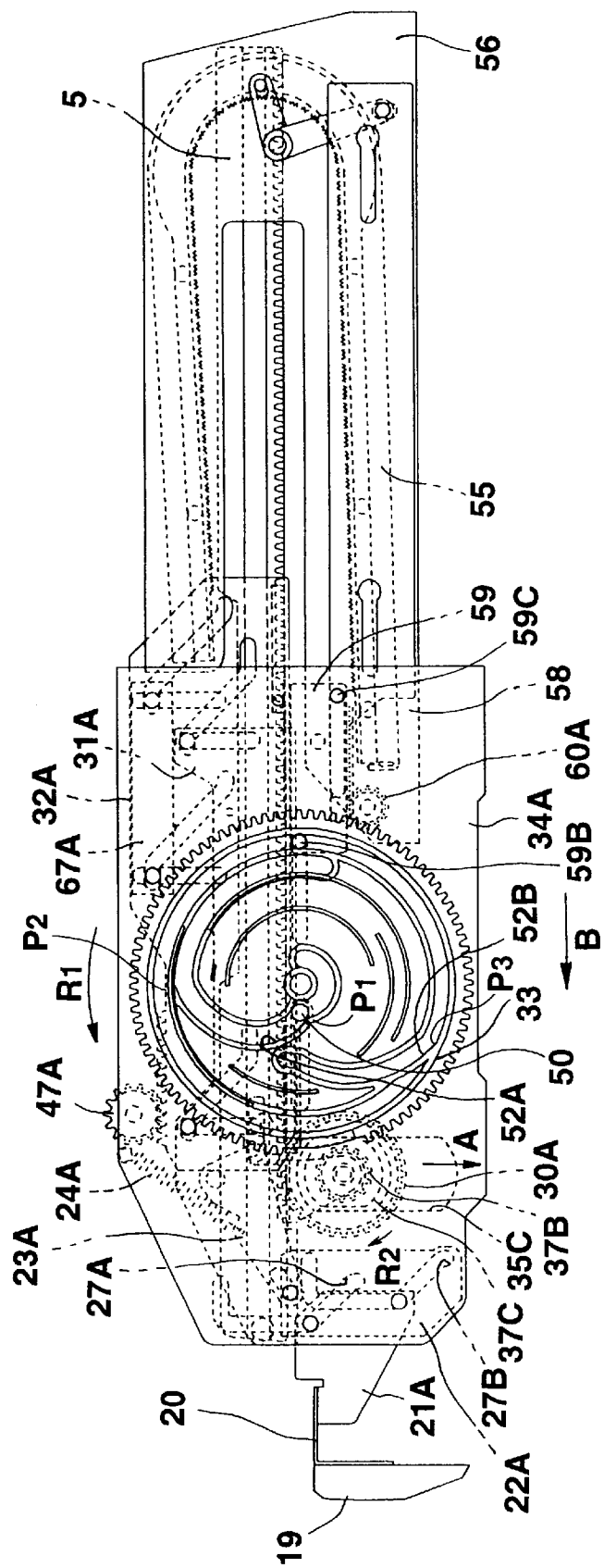
FIG. 9 is a side view similar to FIG. 8 showing the state in which a control gear has been rotated from the state shown in FIG.8.

First, by the control gear 33 rotated counterclockwise by the driving mechanism 11, as indicated by arrow R1 in FIG. 8, the second gear 37B of the movement gear 30A is run in rotation clockwise as indicated by arrow R2 in FIG. 8. By the second gear 37B of the movement gear 30A run in rotation as shown in FIGS. 8 and 9, the first gear portion 37A is run in rotation for moving the rack gear 18B of the disc tray 5. By the movement gear 30A run in rotation, the movement gear 30B is run in rotation via connecting shaft 39 for moving the rack gear 18B of the disc tray 5 by the gear portion 38 of the movement gear 30B.

That is, the disc tray 5 is moved by the movement gears 30A, 30B via rack gear 18B in the horizontal direction as indicated by arrow X1 in FIG. 8 so as to be housed within the casing 1.

When the disc tray 5 is moved to a position housed within the casing 1, by the movement gear 30A run in rotation, as shown in FIG. 9, the cam protrusion 37C is enabled to be moved along the cam groove 35C of the frame 34A. Thus, by the cam protrusion 37C moved along the cam groove 35C, the movement gear 30A is lowered in a direction indicated by arrow A in FIG. 10.

Figure 10:
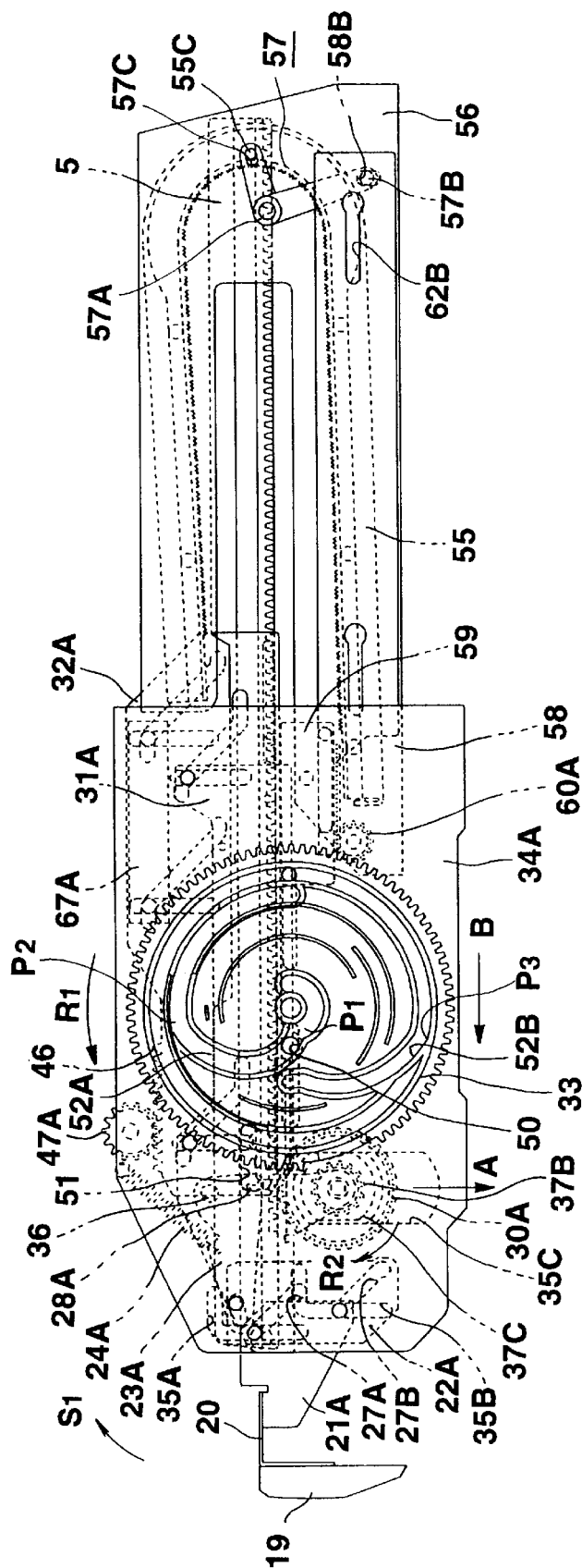
FIG. 10 is a side view similar to FIG. 8 showing the state in which the control gear has been further rotated from the state shown in FIG. 9.
Figure 11:
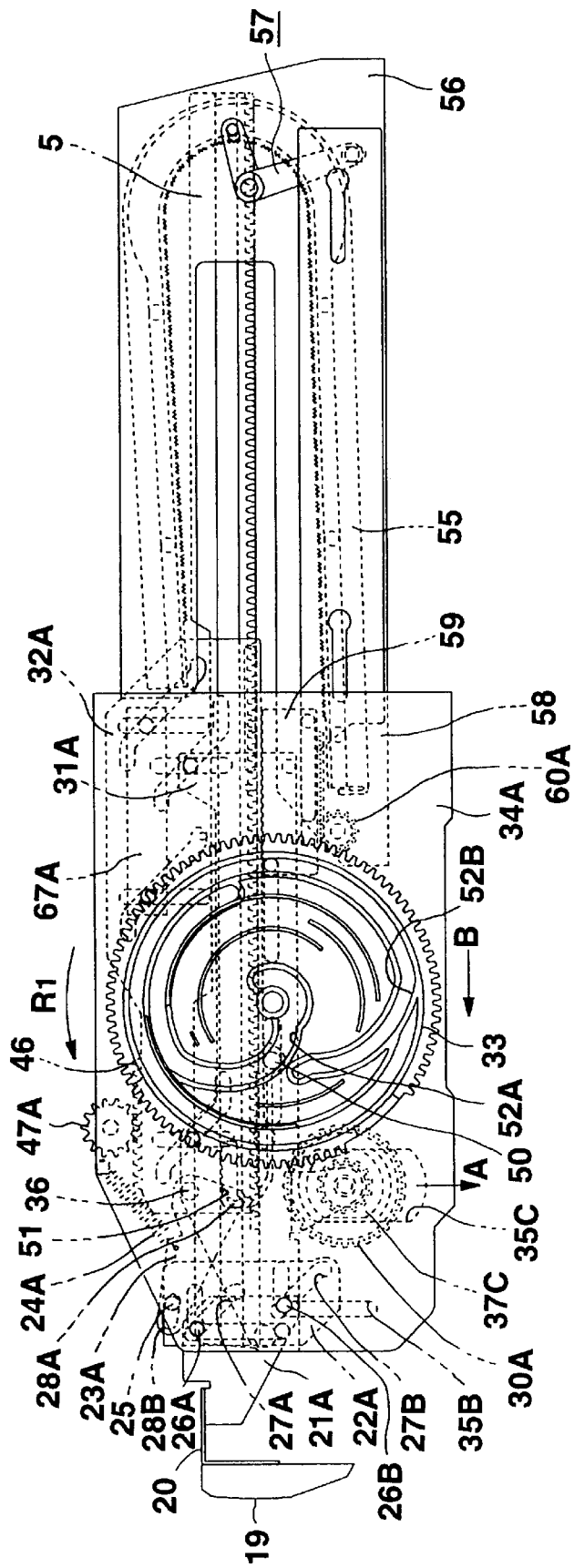
FIG. 11 is a side view similar to FIG. 8 showing the state in which a control gear has been rotated from the state shown in FIG. 10.

By the movement gear 30A being lowered in the direction of arrow A in FIG. 10, the supporting plates 31A, 31B are lowered in a direction indicated by arrow A in FIG. 10. By the movement gear 30A being lowered in the direction of arrow A in FIG. 10, the second gear portion 37B becomes disengaged from the control gear 33.

By the supporting plates 31A, 31B being lowered in the direction of arrow A in FIG. 10, the actuating ribs 28A of the supporting arms 23A, 23B of the opening/closure mechanism 7 for the lid 19 are moved along the actuating slit 51 for starting the opening/closure operation of the aperture by the opening/closure mechanism 7.

The slide plate 32A is moved by the control gear 33 rotated in the direction indicated by arrow R1 in FIG. 10. Simultaneously, the engagement lug 50 is moved along the first cam groove 52A of the of the control gear 33 and along the guide grooves 35H of the frames 34A, 34B as far as the first inflection position P1 where the curvature of the first cam groove 52A is changed.

By the engagement lug 50 moved through the domain in the first cam groove 52A between the first inflection position P1 and the second inflection position P2, the supporting plate 31A is moved in the direction of arrow B shown in FIG. 10, while being lowered in the direction of arrow A in FIG. 10. The supporting plates 31A, 31B, lowered in the direction of arrow A in FIG. 10, lowers the disc tray 5 in the casing 1 to the disc reproducing position.

By the slide plate 32A moved in the direction of arrow B in FIG. 10, the rack gear 46 rotates the link gear 47A. By the link gear 47A, thus rotated, the link gear 47B is rotated via connection shaft 48, so that the slide plates 32A, 32B are moved in synchronism with each other.

By the slide plates 32A, 32B moved in the direction of arrow B in FIG. 10, the supporting protrusions 68A, 68B of the guide members 67A, 67B of the chuck mechanism 9 are moved along the second guide grove 45B and the fourth guide groove 45D for lowering the guide members 67A, 67B in the direction of arrow A in FIG. 10.

Figure 12:
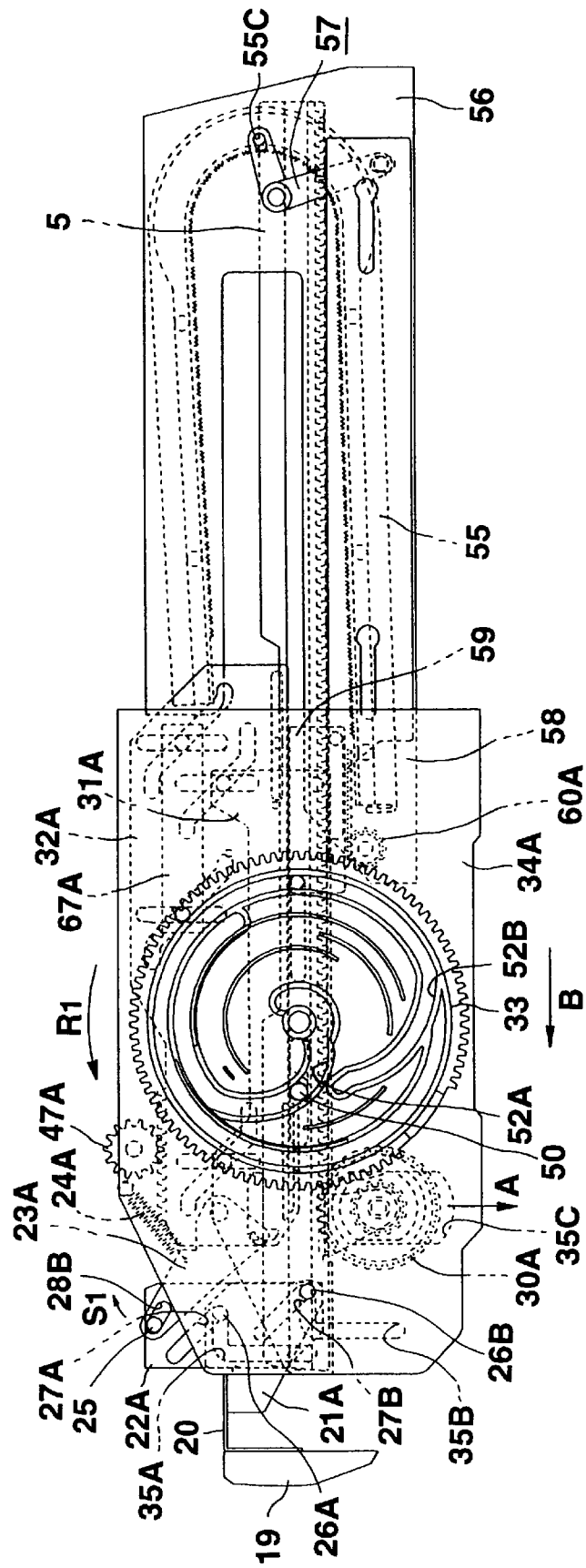
FIG. 12 is a side view similar to FIG. 8 showing the state in which the control gear has been further rotated from the state shown in FIG. 11.
Figure 13:
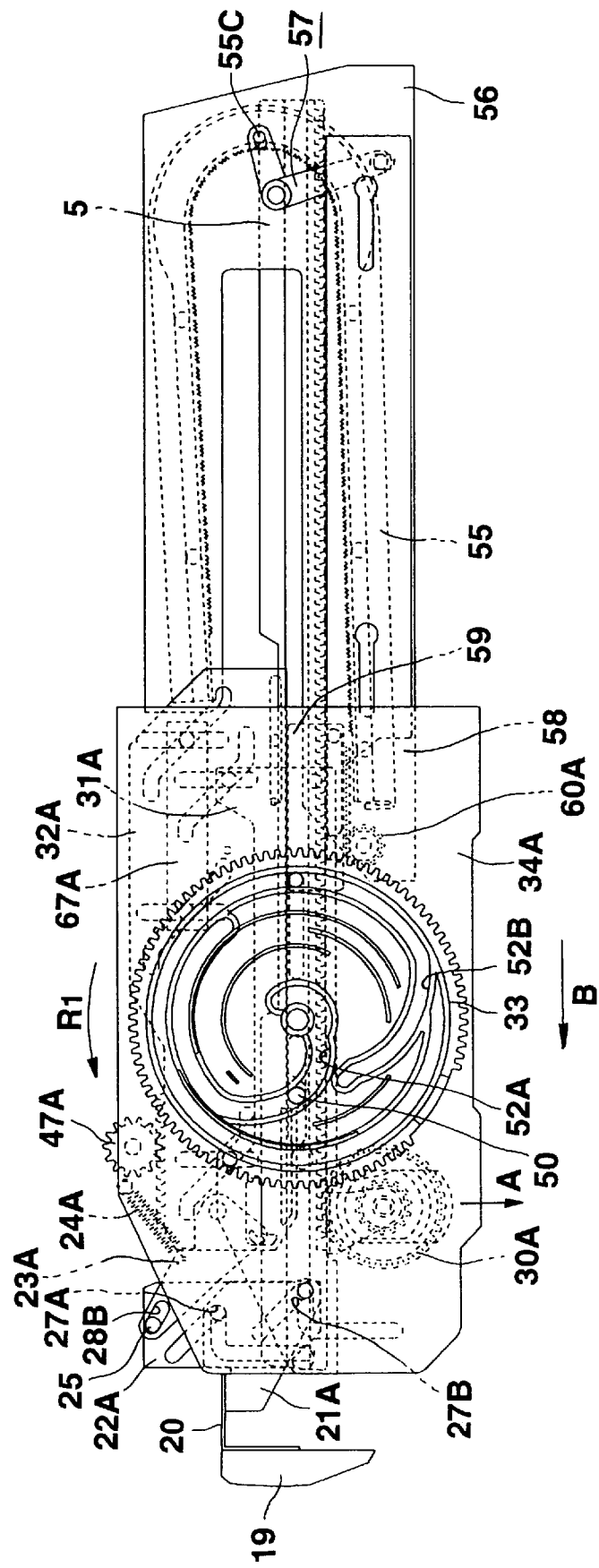
FIG. 13 is a side view similar to FIG. 8 showing the state in which the control gear has been further rotated from the state shown in FIG. 12.

With the opening/closure mechanism 7 for the lid 19, when the disc tray 5 has been moved in the horizontal direction as far as the housing position in the casing 1, as shown in FIGS. 10 to 13, the supporting arms 23A, 23B are rotated by the tension coil springs 24A, 24B clockwise as indicated by arrow S1 in FIGS. 10 and 12.

By the supporting arms 23A, 23B rotated in the direction of arrow S1 in FIGS. 10 and 12, the sliders 22A, 22B are moved via engagement protrusion 25 inserted into the guide grove 28B under guidance by the guide grooves 35A, 35B of the frames 34A, 34B. By the sliders 22A, 22B moved under guidance by the guide grooves 35A, 35B, the supporting protrusions 26A, 26B of the movement plates 21A, 21B are slid along the guide grooves 27A, 27B. By the movement plates 21A, 21B thus slid, the lid 19 is moved via movement plate 20 to the position shown in FIG. 12 for closing the aperture 3A with the lid 19.

Figure 14:
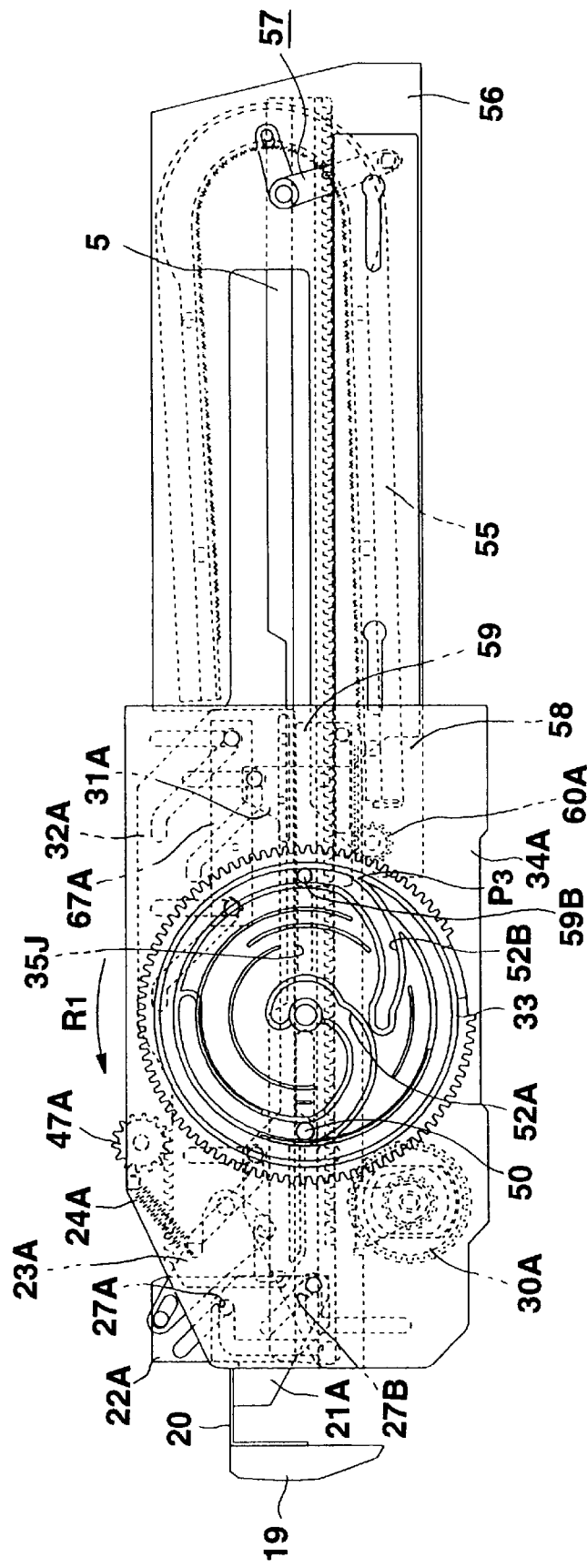
FIG. 14 is aside view showing the state in which the operation of the lid opening/closing mechanism and the disc tray movement mechanism has come to a close.

By the guide members 67A, 67B lowered, the chuck plate 65 is lowered so that the chuck member 55 holds the optical disc 2 set on the disc table 15, as shown in FIG. 14.

With the disc player 1, the adjustment mechanism 10 rotates the guide rail 55 depending on the tilt of the optical axis of the objective lens 14A of the optical pickup 14 relative to the optical disc 2 for adjusting the tilt of the light beam relative the optical disc 2 set on the disc table 15. The tilt adjustment of the light beam relative to the optical disc is hereinafter explained.

Referring to FIG. 14, after the lowering of the disc tray 5 comes to a close, the driving mechanism 11 further runs the control gear 33 in rotation counterclockwise in FIG. 14 for driving the adjustment mechanism 1. By the control ear 33 run in rotation, the cam protrusion 59B of the movement plate 59 is moved along the second cam groove 52B and along the guide groove 35H of the frame 34A to reach the inflection position P3 where the curvature of the cam groove 52B is changed.

Figure 15:
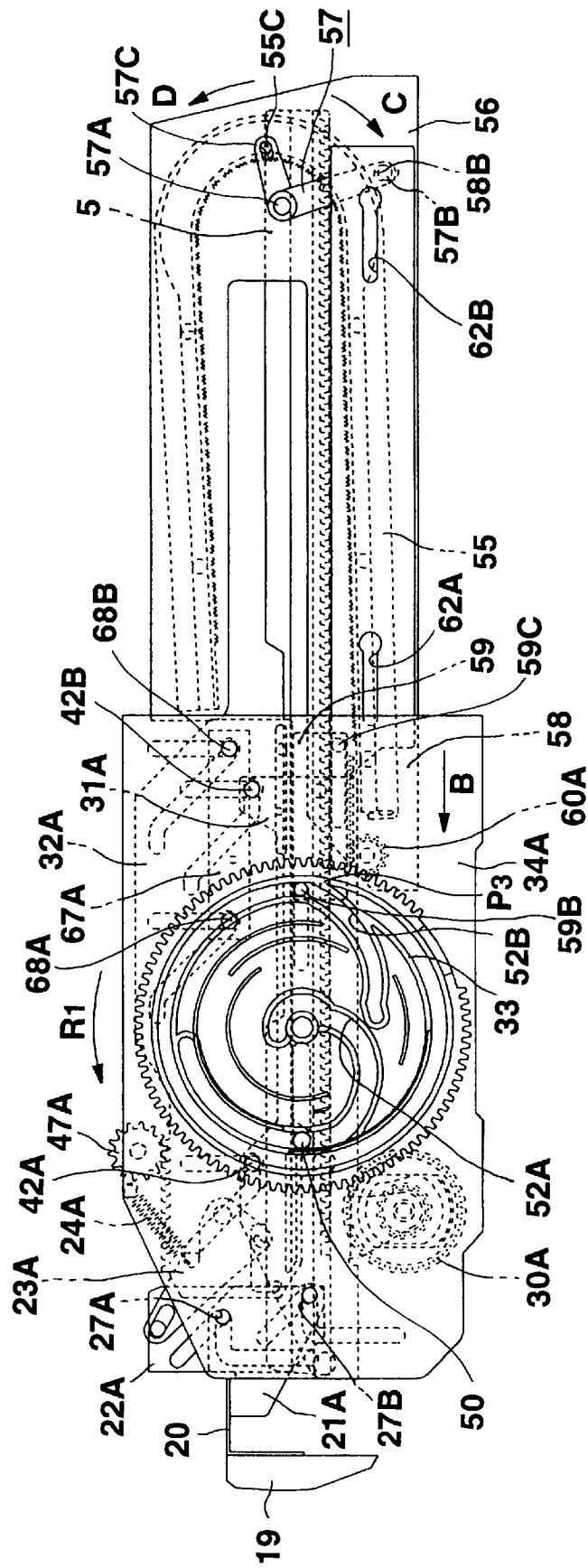
FIG. 15 is a side view for illustrating the starting state of the operation of the adjustment mechanism provided on the disc player.

By the cam protrusion 59B moved through the domain of the second cam groove 52B where the curvature is changed, the engagement lug 50 is moved, so that the slide plates 32A, 32B are moved in a direction shown by arrow B in FIG. 15. By the slide plates 32A, 32B moved in a direction shown by arrow B in FIG. 15, the connection gear 60A is run in rotation via rack gear 46. By the connection gear 60A run in rotation, the connection gear 60B is rotated in unison via connecting shaft 64. The connection gear 60B, thus rotated, moves the rotation plate 58 in a direction of arrow B in FIG. 15. The rotation plate 58, thus rotated in the direction of arrow B in FIG. 15, moves the connection pin 57B of the rotary lever 57 in a direction indicated by arrow C in FIG. 15. The rotary lever 57, rotated in the direction of arrow C in FIG. 15, rotates the guide rail 55 via connection hole 57C. By the guide rail 55 rotated along the first to fifth guide holes 56A to 56E of the disc driving unit supporting substrate 56, the tilt of the optical axis of the objective lens 14A of the optical pickup 14 relative to the optical disc 2 is changed, thus adjusting the tilt of the light beam relative to the optical disc 2 set on the disc table 15.

As described above, the adjustment mechanism 10 is responsive to a detection output of the skew sensor 14B detecting the tilt relative to the optical disc 2 of the optical axis of the light beam radiated from the light source on the optical disc 2 to rotate the control gear 33 clockwise or counterclockwise for adjusting the tilt relative to the optical disc 2 of the optical axis of the objective lens 14A by the optical pickup 14 being rotated by the guide rail 55 rotated in the direction of arrow C or arrow D in FIG. 15, thereby adjusting the tilt of the lightbeam relative to the optical disc 2.

The state of the guide rail 55 shown in FIG. 15 represents the limit of counterclockwise rotation of the guide rail in the direction of arrow D with the rotation protrusion 55C as the fulcrum of rotation. By the control gear 33 rotated counterclockwise in FIG. 15 as indicated by arrow R1, the guide rail 55 is rotated from the tilted state shown in FIG. 15 to the tilted state shown in FIG. 16 for gradually reducing the amount of tilt in the counterclockwise direction indicated by arrow D in FIG. 15.

Figure 16:
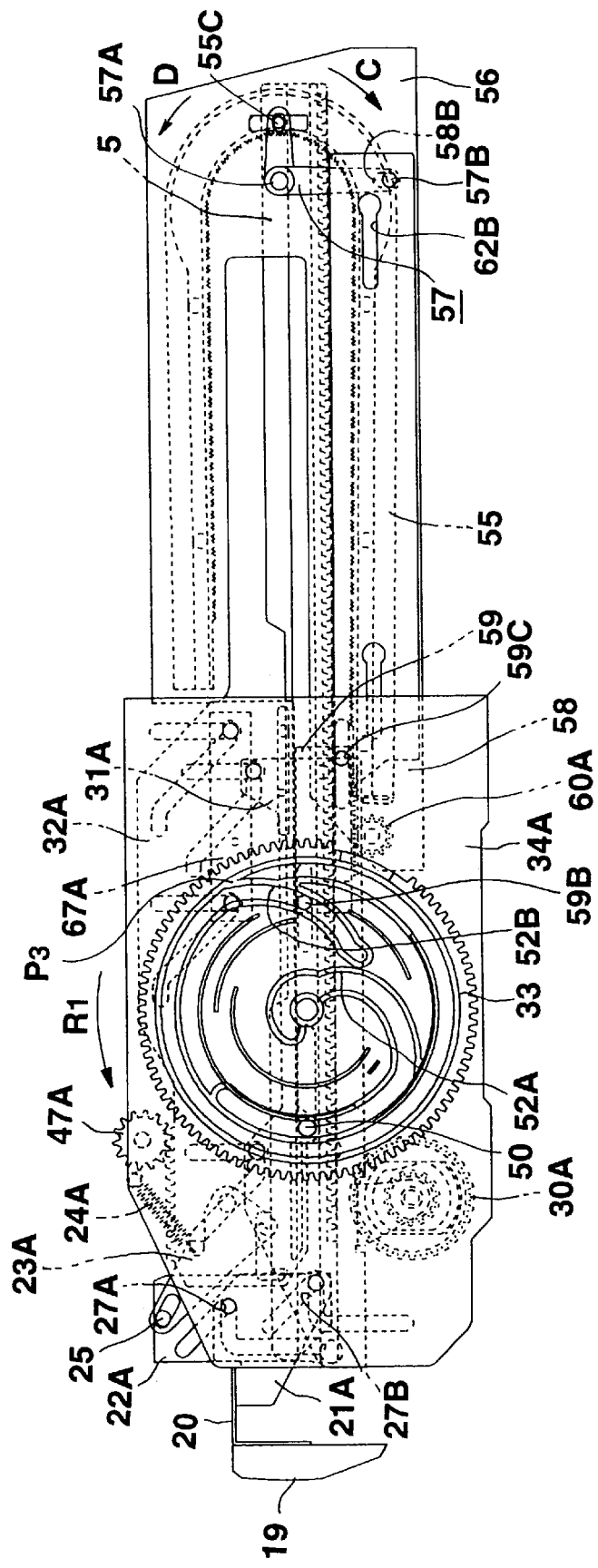
FIG. 16 is a side view similar to FIG. 15 showing the state in which the control gear has been rotated from the state shown in FIG. 15.
Figure 17:
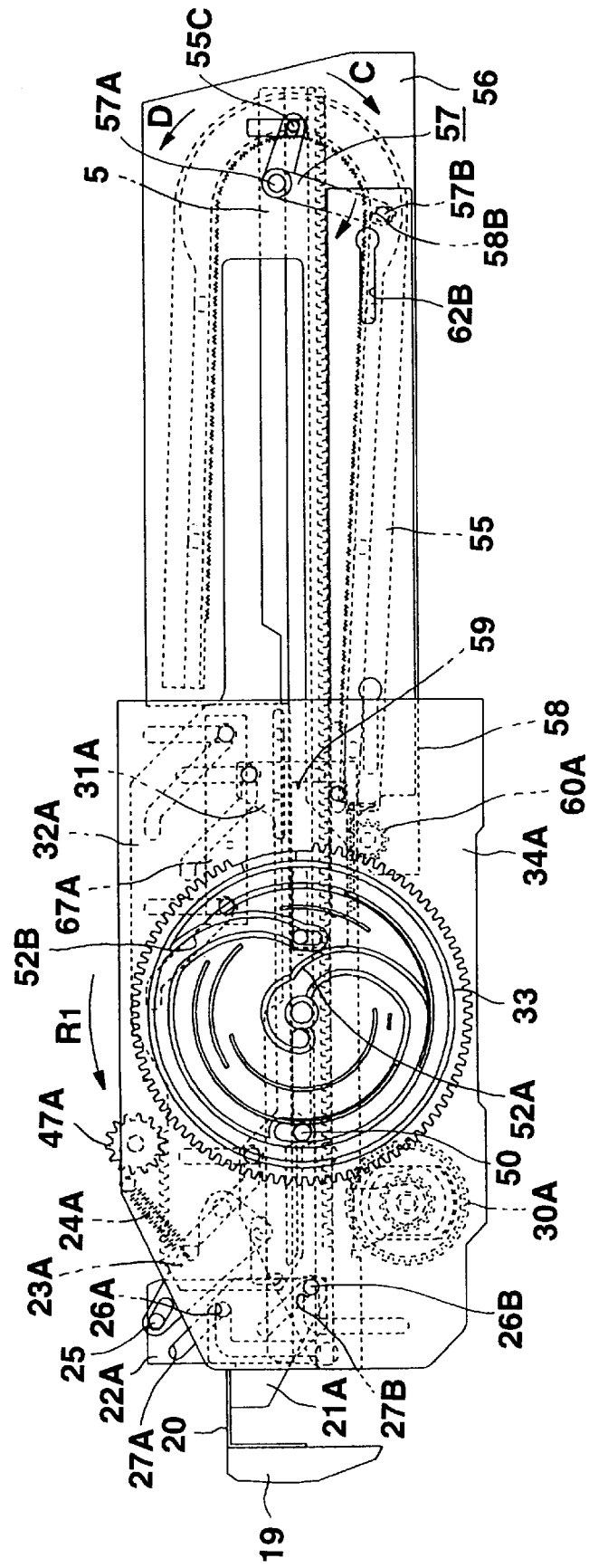
FIG. 17 is a side view similar to FIG. 16 showing the state in which the control gear has been rotated from the state shown in FIG. 16.
Figure 18:
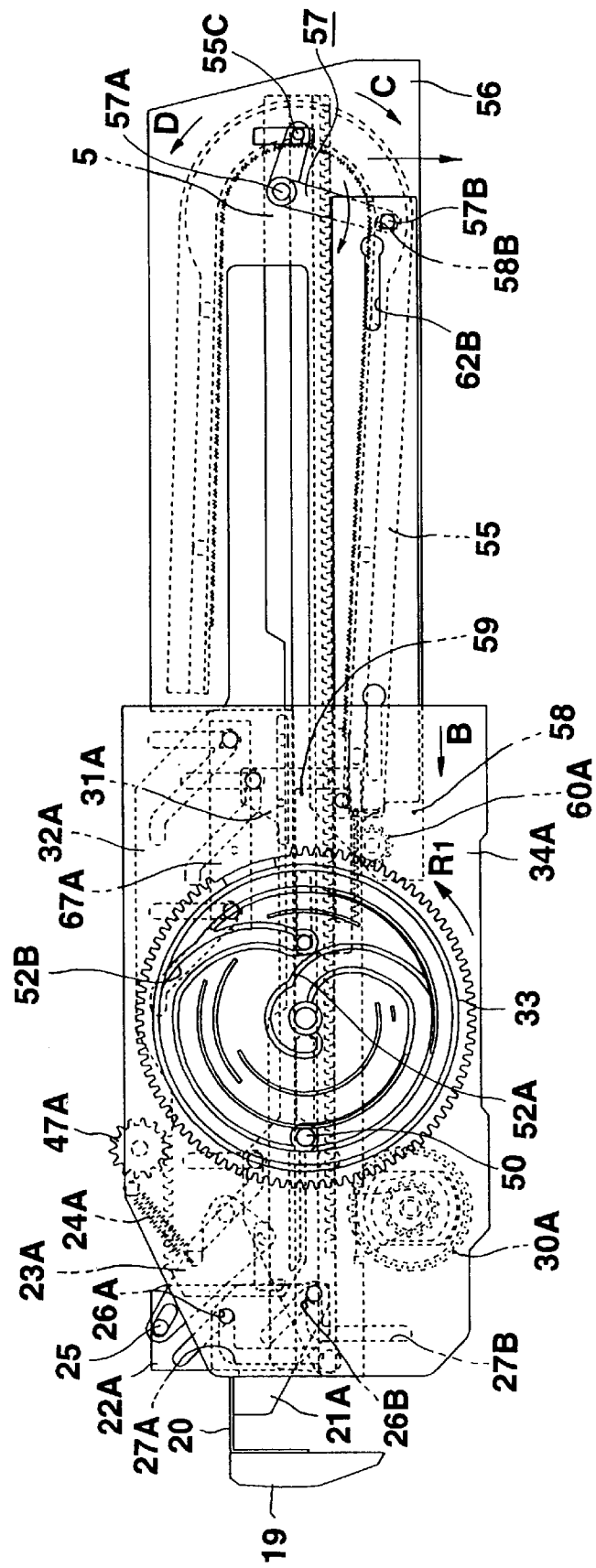
FIG. 18 is a side view for illustrating the end state of the operation of the adjustment mechanism provided on the disc player.

By the control gear 33 rotated further in the direction indicated by arrow R1 in FIG. 15, the guide rail 55 is rotated from the tilted state shown in FIG. 16 to the tilted state shown in FIG. 17 so that the direction of tilt relative to the optical disc 2 is changed from the counterclockwise direction to the clockwise direction. By the guide rail 55 rotated from the tilted state shown in FIG. 17 to the tilted state shown in FIG. 18, the amount of tilt of the guide rail 55 in the clockwise direction is gradually increased. The tilt state of the guide rail 55 shown in FIG. 18 is the state of maximum clockwise rotation as indicated by arrow C in FIG. 18 about the rotation protrusion 55c as the center of rotation.

Since the movement plate 59 is perpetually engaged with the control gear 33, the adjustment mechanism 10 is protected from adverse effects due to impact of descent or the like thus stabilizing the tilt adjustment of the light beam relative to the optical disc 2 for realizing improved reliability.

Since the adjustment mechanism 10 is not provided with an elastic member for retreating pre-set direction, such as spring, during loading or unloading of the optical disc 2 for moving the disc tray 5, no difference is produced in the load of tilt adjustment of the light beam relative to the optical disc 2 caused by rotation of the control gear 33 dependent upon the direction of tilt of the guide rail 55, thus enabling stable tilt adjustment.

With the above-described disc player 1 according to the present invention, since the movement mechanism 8 having the control gear 33 is provided on the lateral surface of the disc tray 5 normal to the setting surface for the optical disc 2, the operation of dismounting or assembling the movement mechanism 8 can be performed easily with the disc tray 5 housed within the casing 1, thus improving the operability in repair works or maintenance of the movement mechanism 8.

In addition, since the entire movement mechanism 8 is simplified in structure, the loading operation is stabilized, thus improving the reliability in the loading operation.

It is to be noted that the present invention is not limited to the disc player 1 but may be applied to a disc recording/reproducing apparatus for a bonded optical disc comprised of plural optical discs bonded together, or a re-recordable optical disc, such as a magneto-optical disc, with similar advantages to those obtained with the disc player.

What is claimed is:

1. A recording/reproducing apparatus for a disc, comprising:
    a disc tray mounted for movement between a position protruded from a casing via an aperture formed therein and a position housed within said casing, said disc tray having a recess in which to set the disc; and
    a movement mechanism for moving said disc tray between the protruded position and the housed position;
    said movement mechanism having a lift mechanism for lifting or lowering the disc tray in a direction normal to the direction of movement between the protruded position and the housed position when said disc tray reaches the housed position, said lift mechanism having a control gear arranged on a lateral surface of said casing, and said control gear having a cam groove along which the disc tray reaching said housed position is lifted or lowered by said movement mechanism;
    wherein said movement mechanism includes a movement gear engaged with said control gear for moving said disc tray between the protruded position and the housed position and wherein said lift mechanism includes a pair of sliders moved by said control gear for lifting and lowering the disc tray; and further wherein said movement gear is disengaged from the control gear when the disc tray reaches the housed position, said movement gear causing the control gear to lower the pair of sliders to lower the disc tray.

2. The apparatus of claim 1 wherein said lift mechanism includes a link mechanism for moving said pair of sliders in synchronism with each other, one of the sliders having an engagement portion engaging with said cam groove formed in the control gear, said one slider being moved by said link mechanism in synchronism with the other slider.

3. The apparatus of claim 2 further comprising:
    a rotational driving mechanism for rotationally driving a disc transported by said disc tray; and
    a clamper mechanism for clamping the transported disc along with said rotational driving mechanism, said clamper mechanism being operatively linked with the lifting and lowering movement of said disc tray by said lift mechanism so as to be lifted and lowered in association with the lifting and lowering movement of said disc tray.

4. The apparatus of claim 3 wherein each of said slider in said pair has a groove for lifting and lowering said clamper mechanism and wherein said clamper mechanism has an engagement portion engaged with said groove.

5. The apparatus of claim 1 further comprising:
    a rotational driving mechanism for rotationally driving a disc transported by said disc tray; and
    a clamper mechanism for clamping the transported disc along with said rotational driving mechanism, said clamper mechanism being operatively linked with the lifting and lowering movement of said disc tray by said lift mechanism so as to be lifted and lowered in association with the lifting and lowering movement of said disc tray.

6. The apparatus of claim 5 wherein each of said slider in said pair has a groove for lifting and lowering said clamper mechanism and wherein said clamper mechanism has an engagement portion engaged with said groove.

7. A recording/reproducing apparatus for a disc, comprising:
    a disc tray mounted for movement between a position protruded from a casing via an aperture formed therein and a position housed within said casing, said disc tray having a recess in which to set the disc; and
    a movement mechanism for moving said disc tray between the protruded position and the housed position;
    said movement mechanism having a lift mechanism for lifting or lowering the disc tray in a direction normal to the direction of movement between the protruded position and the housed position when said disc tray reaches the housed position, said lift mechanism having a control gear arranged on a lateral surface of said casing, and said control gear having a cam groove along which the disc tray reaching said housed position is lifted or lowered by said movement mechanism;
    wherein said movement mechanism includes a movement gear engaged with said control gear for moving said disc tray between the protruded position and the housed position and wherein said lift mechanism includes a pair of sliders moved by said control gear for lifting and lowering the disc tray; and further wherein said lift mechanism includes a link mechanism for moving said pair of sliders in synchronism with each other, one of the sliders having an engagement portion engaging with said cam groove formed in the control gear, said one slider being moved by said link mechanism in synchronism with the other slider.

8. The apparatus of claim 7 further comprising:
    a rotational driving mechanism for rotationally driving a disc transported by said disc tray; and
    a clamper mechanism for clamping the transported disc along with said rotational driving mechanism, said clamper mechanism being operatively linked with the lifting and lowering movement of said disc tray by said lift mechanism so as to be lifted and lowered in association with the lifting and lowering movement of said disc tray.

9. The apparatus of claim 8 wherein each of said slider in said pair has a groove for lifting and lowering said clamper mechanism and wherein said clamper mechanism has an engagement portion engaged with said groove.

10. A method of recording/reproducing on a disc, comprising the steps of:
    mounting a disc tray for movement between a position protruded from a casing via an aperture formed therein and a position housed within said casing, said disc tray having a recess in which to set the disc; and
    providing a movement mechanism for moving said disc tray between the protruded position and the housed position;

said step of providing said movement mechanism includes the step of providing a lift mechanism for lifting or lowering the disc tray in a direction normal to the direction of movement between the protruded position and the housed position when said disc tray reaches the housed position, said step of providing said lift mechanism includes the step of arranging a control gear on a lateral surface of said casing, and said step of arranging said control gear includes the step of providing a cam groove along which the disc tray reaching said housed position is lifted or lowered by said movement mechanism;

wherein said step of providing said movement mechanism includes engaging a movement gear with said control gear for moving said disc tray between the protruded position and the housed position and wherein said step of providing said lift mechanism includes the step of moving a pair of sliders by said control gear for lifting and lowering the disc tray; and disengaging said movement gear from the control gear when the disc tray reaches the housed position, said movement gear causing the control gear to lower the pair of sliders to lower the disc tray.

11. The method of claim 10 wherein said step of providing said lift mechanism includes the step of providing a link mechanism for moving said pair of sliders in synchronism with each other, one of the sliders having an engagement portion engaging with said cam groove formed in the control gear, said one slider being moved by said link mechanism in synchronism with the other slider.

12. The method of claim 11 further comprising the steps of:

rotationally driving a disc transported by said disc tray by a rotational driving mechanism; and clamping the transported disc with a clamper mechanism along with said rotational driving mechanism, said clamper mechanism being operatively linked with the lifting and lowering movement of said disc tray by said lift mechanism so as to be lifted and lowered in association with the lifting and lowering movement of said disc tray.

13. The method of claim 12 further including the steps of providing a groove for each of said slider in said pair for lifting and lowering said clamper mechanism, and engaging said clamper mechanism at an engagement portion with said groove.

14. The method of claim 10 further comprising the steps of:

rotationally driving a disc transported by said disc tray by a rotational driving mechanism; and clamping the transported disc with a clamper mechanism along with said rotational driving mechanism, said clamper mechanism being operatively linked with the lifting and lowering movement of said disc tray by said lift mechanism so as to be lifted and lowered in association with the lifting and lowering movement of said disc tray.

15. The method of claim 14 further including the steps of providing a groove for each of said slider in said pair for lifting and lowering said clamper mechanism, and engaging said clamper mechanism at an engagement portion with said groove.

16. A method of recording/reproducing on a disc, comprising the steps of:

mounting a disc tray for movement between a position protruded from a casing via an aperture formed therein and a position housed within said casing, said disc tray having a recess in which to set the disc; and providing a movement mechanism for moving said disc tray between the protruded position and the housed position;

said step of providing said movement mechanism includes the step of providing a lift mechanism for lifting or lowering the disc tray in a direction normal to the direction of movement between the protruded position and the housed position when said disc tray reaches the housed position, said step of providing said lift mechanism includes the step of arranging a control gear on a lateral surface of said casing, and said step of arranging said control gear includes the step of providing a cam groove along which the disc tray reaching said housed position is lifted or lowered by said movement mechanism;

wherein said step of providing said movement mechanism includes engaging a movement gear with said control gear for moving said disc tray between the protruded position and the housed position and wherein said step of providing said lift mechanism includes the step of moving a pair of sliders by said control gear for lifting and lowering the disc tray; and further wherein said step of providing said lift mechanism includes the step of providing a link mechanism for moving said pair of sliders in synchronism with each other, one of the sliders having an engagement portion engaging with said cam groove formed in the control gear, said one slider being moved by said link mechanism in synchronism with the other slider.

17. The method of claim 16 further comprising the steps of:

rotationally driving a disc transported by said disc tray by a rotational driving mechanism; and clamping the transported disc with a clamper mechanism along with said rotational driving mechanism, said clamper mechanism being operatively linked with the lifting and lowering movement of said disc tray by said lift mechanism so as to be lifted and lowered in association with the lifting and lowering movement of said disc tray.

18. The method of claim 17 further including the steps of providing a groove for each of said slider in said pair for lifting and lowering said clamper mechanism, and engaging said clamper mechanism at an engagement portion with said groove.

* * * * *